US009288791B2

(12) United States Patent
Park et al.

(10) Patent No.: US 9,288,791 B2
(45) Date of Patent: Mar. 15, 2016

(54) METHOD FOR REPORTING CHANNEL STATE INFORMATION IN A WIRELESS COMMUNICATION SYSTEM, AND APPARATUS THEREFOR

(75) Inventors: Jonghyun Park, Anyang-si (KR); Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 13/976,662

(22) PCT Filed: Dec. 28, 2011

(86) PCT No.: PCT/KR2011/010220
§ 371 (c)(1),
(2), (4) Date: Jun. 27, 2013

(87) PCT Pub. No.: WO2012/091448
PCT Pub. Date: Jul. 5, 2012

(65) Prior Publication Data
US 2013/0279455 A1 Oct. 24, 2013

Related U.S. Application Data

(60) Provisional application No. 61/428,214, filed on Dec. 29, 2010, provisional application No. 61/430,145, filed on Jan. 5, 2011, provisional application No. 61/433,514, filed on Jan. 17, 2011.

(51) Int. Cl.
*H04W 4/00* (2009.01)
*H04W 72/04* (2009.01)
*H04L 27/26* (2006.01)
*H04L 5/00* (2006.01)
(Continued)

(52) U.S. Cl.
CPC .............. *H04W 72/04* (2013.01); *H04L 1/0028* (2013.01); *H04L 5/0035* (2013.01);*H04L 5/0057* (2013.01); *H04L 27/2602* (2013.01); *H04B 7/024* (2013.01); *H04B 7/0626* (2013.01); *H04L 1/0026* (2013.01); *H04W 24/10* (2013.01)

(58) Field of Classification Search
CPC ............... H04L 5/0035; H04W 72/08–72/087; H04W 72/1226–72/1236
See application file for complete search history.

(56) References Cited

U.S. PATENT DOCUMENTS

2010/0098012 A1* 4/2010 Bala et al. ...................... 370/329
2010/0099364 A1* 4/2010 Yang et al. ...................... 455/69
2010/0254335 A1 10/2010 Koo et al.

FOREIGN PATENT DOCUMENTS

WO   WO 2010-147416   12/2010

OTHER PUBLICATIONS (4) 3GPP, "3rd Generation Partnership Project; Technical Specification Group Radio Access Network; Evolved Universal Terrestrial Radio Access (E-UTRA); Multiplexing and channel coding (Release 9)." 3GPP TS 36.212 V9.2.0, Jun. 2010 R.
(Continued)

*Primary Examiner* — Chi H Pham
*Assistant Examiner* — Fahmida Chowdhury
(74) *Attorney, Agent, or Firm* — Dentons US LLP

(57) ABSTRACT

The present invention relates to a wireless communication system. More particularly, the present invention relates to a method and apparatus for reporting channel state information, wherein the method comprises the following steps: receiving configuration information for periodically reporting channel state information; and periodically reporting the channel state information for a each of a plurality of periods based on the configuration information, wherein the channel state information is repeated so as to have a predetermined pattern based on periods, of which a second period is longer than a first period. The second period has a first value in a single transmission point operation mode. The second period has a sum of the first value and a second value which is proportional to the number of coordinated transmission points involved in a coordinated multi-point transmission operation in a coordinated multi-point transmission operation mode.

14 Claims, 18 Drawing Sheets

(51) Int. Cl.
  *H04B 7/06* (2006.01)
  *H04L 1/00* (2006.01)
  *H04W 24/10* (2009.01)
  *H04B 7/02* (2006.01)

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)." 3GPP TS 36.213 V9.2.0, Jun. 2010 (Retrieved from the Internet on Mar. 28, 2012; <URL: http://wvvw.3gpp.org/ftp/Sphes/html-info/36213.htm.) sections 7,9.

3GPP, "3rd Generation Partnership Project; Technical Specification Group Radio Access Network; Evolved Universal Terrestrial Radio Access (E-UTRA); Physical layer procedures (Release 9)." 3GPP TS 36.213 V9.2.0, Jun. 2010 (Retrieved from the Internet on Mar. 28, 2012; <URL: http://www.3gpp.org/ftp/Sphes/html-info/36213.htm.) section 5.3.

* cited by examiner

FIG. 2
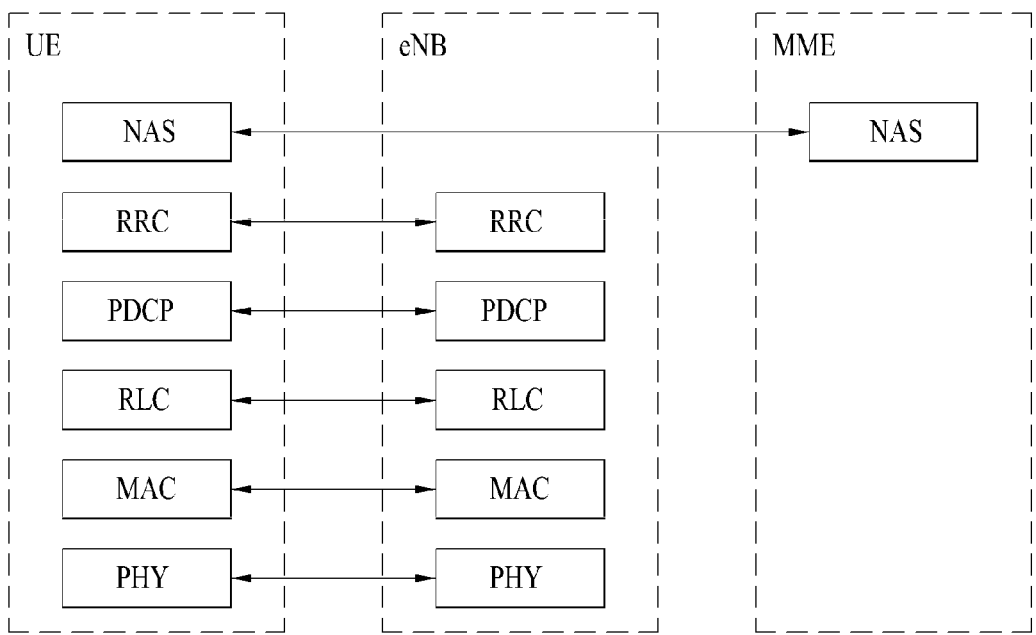
(a) control-plane protocol stack
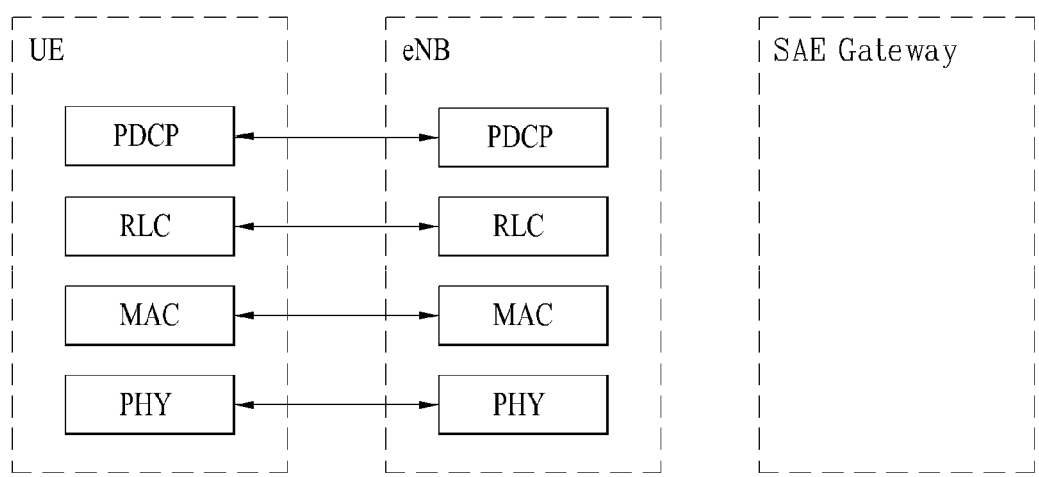
(b) user-plane protocol stack

| CQI reporting mode | | PMI feedback type | |
| --- | --- | --- | --- |
| | | no PMI | single PMI |
| PUCCH CQI feedback type | wideband (wideband CQI) | mode 1-0 | mode 1-1 |
| | UE-selected (subband CQI) | mode 2-0 | mode 2-1 |

FIG. 14
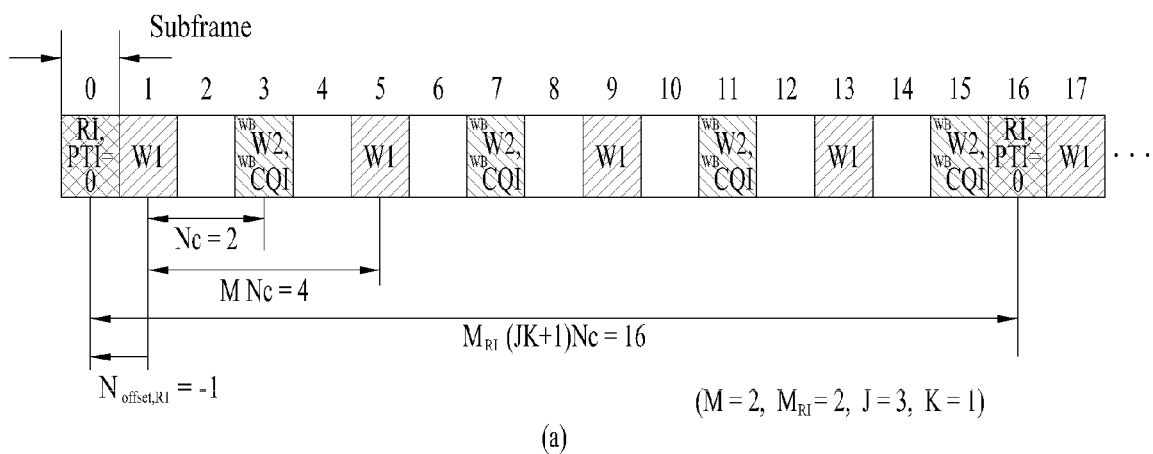
$(M = 2, M_{RI} = 2, J = 3, K = 1)$
(a)
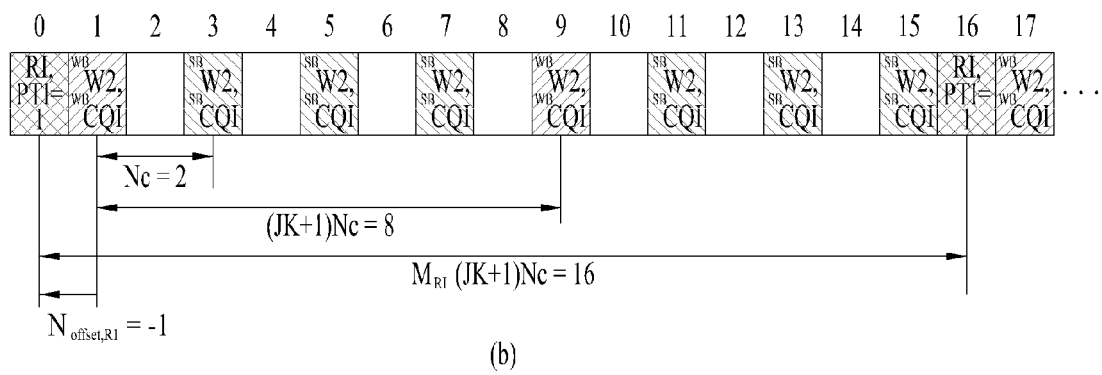
(b)
 Report 1   Report 2 w/ PTI=0   Report 3 w/ PTI=0
 Report 2 w/ PTI=1   Report 3 w/ PTI=1

METHOD FOR REPORTING CHANNEL STATE INFORMATION IN A WIRELESS COMMUNICATION SYSTEM, AND APPARATUS THEREFOR

This Application is a 35 U.S.C. §371 National Stage Entry of International Application No. PCT/KR2011/010220, filed Dec. 28, 2011, and claims the benefit of U.S. Provisional Application Nos. 61/428,214, filed Dec. 29, 2010, 61/430,145, filed Jan. 5, 2011, and 61/433,514, filed Jan. 17, 2011, all of which are incorporated by reference in their entirety herein.

TECHNICAL FIELD

The present invention relates to a wireless communication system and, more particularly, to a method and device for reporting channel state information in a wireless communication system.

BACKGROUND ART

3GPP LTE ($3^{rd}$ Generation Partnership Project Long Term Evolution, referred to as 'LTE' hereinafter) will now be described as an exemplary wireless communication system to which the present invention is applicable.

FIG. 1 illustrates an E-UMTS (Evolved Universal Mobile Telecommunications System) as a wireless communication system. The E-UMTS is a system evolved from UMTS (Universal Mobile Telecommunications System) and currently standardized in 3GPP. The E-UMTS may be referred to as an LTE (Long Term Evolution) system. For details of the technical specifications of UMTS and E-UMTS, refer, respectively, to Release 7 and Release 8 of "$3^{rd}$ Generation Partnership Project; Technical specification Group Radio Access Network".

Referring to FIG. 1, the E-UMTS includes a user terminal (UE), an eNode B (eNB), and an access gateway (AG) located at the end of the network (E-UMTS) and connected to an external network. The eNB can simultaneously transmit multiple data streams for a broadcast service, multicast service and/or unicast service.

One or more cells are present per base station. A cell sets one of bandwidths of 1.25 MHz, 2.5 MHz, 5 MHz, 10 MHz, 15 MHz and 20 MHz for a carrier and provides downlink/uplink transmission service to a plurality of UEs. Different cells may provide different bandwidths. An eNB controls data transmission/reception to/from a plurality of UEs. The eNB transmits downlink scheduling information about downlink data to a UE to inform the UE of a time/frequency region in which the downlink data will be transmitted, coding information, data size, hybrid automatic repeat and request (HARQ) related information, etc. The eNB transmits uplink scheduling information about uplink data to the UE to inform the UE of a time/frequency region that can be used by the UE, coding information, data size, HARQ related information, etc. An interface for user traffic or control traffic transmission may be used between eNBs.

While wireless communication technology has been developed into LTE based on wideband code division multiple access (WCDMA), demands and expectations of users and providers continue to increase. Furthermore, technical evolution is needed for future competitiveness of wireless communication technology since other wireless access technologies are under development. For technical evolution, reduction of cost per bit, service availability increase, flexible use of frequency band, simplified structure, open interface, appropriate power consumption of terminals, etc. are required.

DISCLOSURE

Technical Problem

An object of the present invention devised to solve the problem lies in a method and device for reporting channel state information in a wireless communication system.

Technical Solution

The object of the present invention can be achieved by providing a method for reporting channel state information at a UE in a wireless communication system, the method including: receiving configuration information for periodically reporting channel state information; and periodically reporting the channel state information at first periods based on the configuration information, wherein the channel state information is repeated so as to have a predetermined pattern at second periods, a second period being longer than a first period, wherein the second period is set to a first value in a single point transmission mode and set to a sum of the first value and a second value proportional to the number of coordinating transmission points involved in a coordinated multi-point transmission operation in a coordinated multi-point transmission mode.

In another aspect of the present invention, provided herein is a UE configured to transmit channel state information in a wireless communication system, including: a radio frequency (RF) module; and a processor, wherein the processor is configured to receive configuration information for periodically reporting channel state information and to periodically report the channel state information at first periods based on the configuration information, wherein the channel state information is repeated so as to have a predetermined pattern at second periods, a second period being longer than a first period, wherein the second period is set to a first value in a single point transmission mode and set to a sum of the first value and a second value proportional to the number of coordinating transmission points involved in a coordinated multi-point transmission operation in a coordinated multi-point transmission mode.

Channel state information transmitted in an interval corresponding to the second value in the second period may include channel state information for a coordinated multi-point transmission operation.

The channel state information for the coordinated multi-point transmission operation may include channel state information about coordinated transmission points.

The channel state information for the coordinated multi-point transmission operation may include only a wideband PMI for a coordinated transmission point.

The channel state information for the coordinated multi-point transmission operation may include a CQI calculated on the assumption of a CoMP CB (coordinated multi-point coordinated beamforming) operation.

The coordinated multi-point transmission operation may include a CoMP operation.

The channel state information may be transmitted through a physical uplink control channel (PUCCH).

Advantageous Effects

According to the present invention, it is possible to report channel state information in a wireless communication system more effectively.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control plane and a user plane of a radio interface protocol between a UE and E-UMTS based on the 3GPP wireless access network specification.

FIG. 14 illustrates a process of periodically reporting channel state information when a hierarchical codebook is used.

BEST MODE

Figure 1:
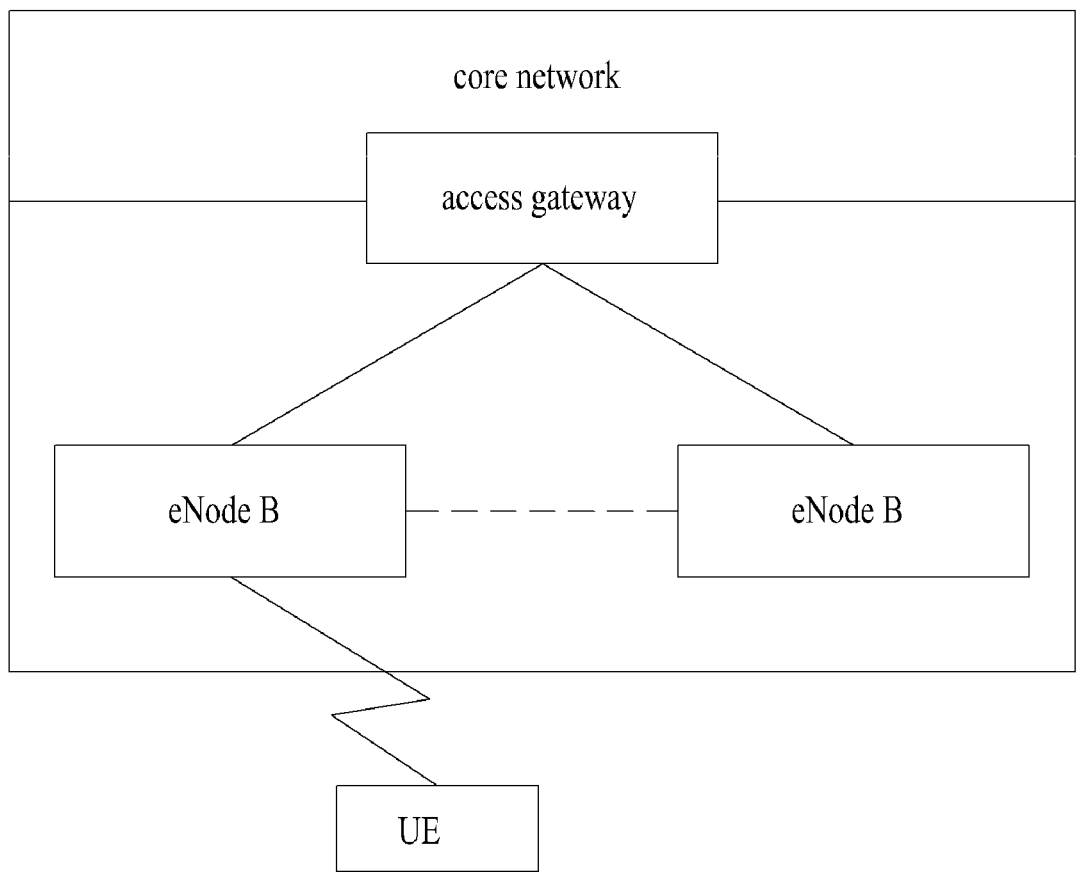
FIG. 1 illustrates E-UMTS as an exemplary wireless communication system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In embodiments described below, technical features of the present invention are applied to 3GPP.

While the following description focuses on LTE and LTE-A, this is purely exemplary and thus should not be construed as limiting the present invention. Furthermore, while the following description is given based on FDD, embodiments of the present invention can be applied to H-FDD or TDD.

FIG. 2 illustrates a control plane and a user plane of a radio interface protocol between a UE and E-UMTS based on the 3GPP wireless access network specification. The control plane refers to a path through which control messages that a UE and a network use to manage a call are transmitted. The user plane refers to a path through which data generated in an application layer, for example, audio data or Internet packet data is transmitted.

A physical layer, a first layer, provides an information transfer service to a higher layer using a physical channel. The physical layer is linked to a medium access control (MAC) layer corresponding to a higher layer through a transport channel. Data is transmitted between the MAC layer and the physical layer through the transport channel. Data is transmitted between physical layers of a transmitter and a receiver through a physical channel. The physical channel uses time and frequency as radio resources. Specifically, the physical layer is modulated according to OFDMA (Orthogonal Frequency Division Multiple Access) on downlink and modulated according to SC-FDMA (Single Carrier Frequency division Multiple Access) on uplink.

The MAC layer, a second layer, provides a service to a radio link control (RLC) layer corresponding to a higher layer through a logical channel. The RLC layer supports reliable data transmission. Functions of the RLC layer may be implemented as functional blocks in the MAC layer. A PDCP (Packet Data Convergence Protocol) layer, a second layer, performs a header compression function of reducing unnecessary control information to efficiently transmit an IP packet such as IPv4 or IPv6 in a radio interface having a narrow bandwidth.

An RRC (Radio Resource Control) layer corresponding to the lowest of third layers is defined only in the control plane. The RRC layer controls logical channels, transport channels and physical channels with respect to configuration, reconfiguration and release of radio bearers (RBs). An RB refers to a service provided by the second layer for data transmission between a UE and a network. For data transmission between the UE and network, RRC layers of the UE and network exchange RRC messages. The UE is in an RRC connected mode when the RRC layers of the UE and network are RRC connected and is otherwise in an idle mode. A NAS (Non-Access Stratum) layer higher than the RRC layer performs session management and mobility management.

A cell constituting an eNB is set to one of bandwidths of 1.25 MHz, 2.5 MHz, 5 MHz, 10 MHz, 15 MHz and 20 MHz and provides a downlink or uplink transmission service to a plurality of UEs. Different cells may provide different bandwidths.

Downlink transport channels for transmitting data from a network to a UE include a broadcast channel (BCH) for transmitting system information, a paging channel (PCH) for transmitting a paging message, a downlink shared channel (SCH) for transmitting a user traffic or control message, etc. A traffic or control message of downlink multicast or broadcast service may be transmitted through the downlink SCH or a downlink multicast channel (MCH). Uplink transport channels for transmitting data from a UE to a network include a random access channel (RACH) for transmitting an initial control message and an uplink SCH for transmitting a user traffic or control message. Logical channels which are higher than transport channels and are mapped to the transport channels include a broadcast control channel (BCCH), a paging control channel (PCCH), a common control channel (CCCH), a multicast control channel (MCCH), a multicast traffic channel (MTCH), etc.

Figure 3:
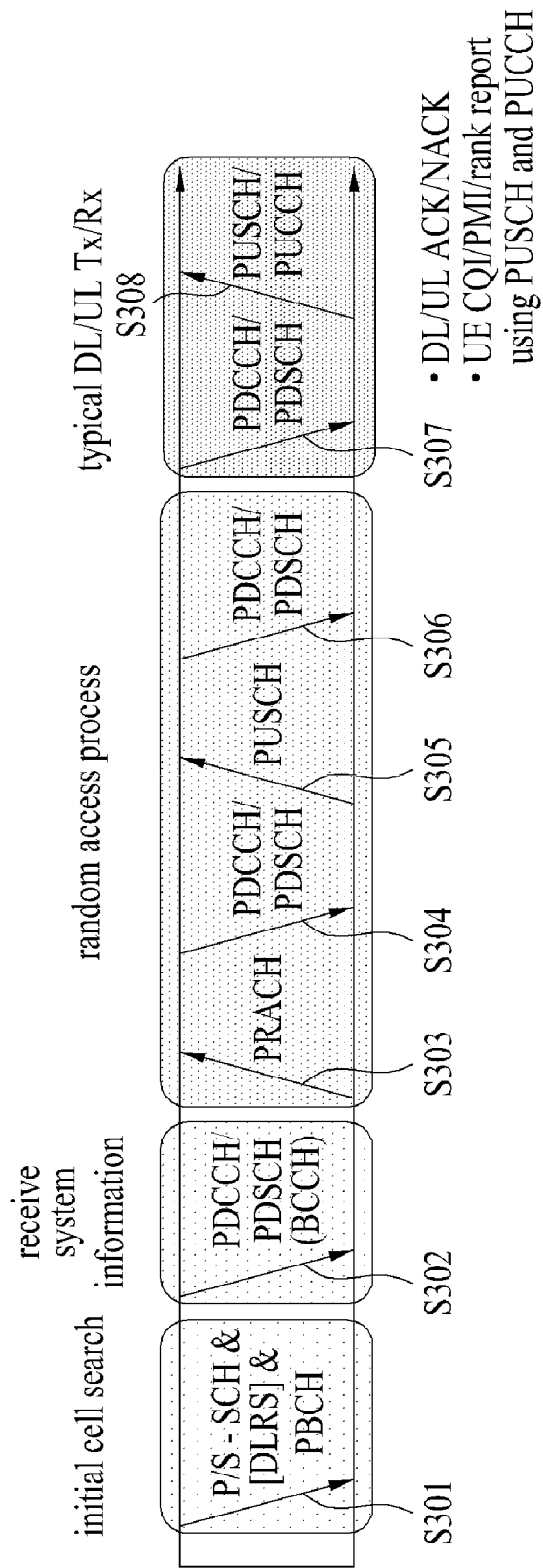
FIG. 3 illustrates physical channels used for a 3GPP system and a method of transmitting a signal using the physical channels.

FIG. 3 illustrates physical channels used for a 3GPP system and a method of transmitting a signal using the physical channels.

When powered on or when a UE initially enters a cell, the UE performs initial cell search involving synchronization with an eNB (S301). For initial cell search, the UE is synchronized with the eNB and acquires information such as a cell ID by receiving a primary synchronization channel (P-SCH) and a secondary synchronization channel (S-SCH)

from the eNB. Then the UE may receive broadcast information from the eNB on a physical broadcast channel. The UE may determine a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH (S302).

When the UE initially accesses the eNB or there is no radio resource for signal transmission, the UE may perform a random access procedure (RACH) to access the eNB (S303 to S306). For random access, the UE may transmit a preamble to the eNB on a physical random access channel (PRACH) (S303 and S305) and receive a response message for preamble on a PDCCH and a PDSCH corresponding to the PDCCH (S304 and S306). In the case of contention-based random access, the UE may additionally perform a contention resolution procedure.

After the foregoing procedure, the UE may receive a PDCCH/PDSCH (S307) and transmit a physical uplink shared channel (PUSCH)/physical uplink control channel (PUCCH) (S308), as a general downlink/uplink signal transmission procedure. Particularly, the UE receives downlink control information (DCI) through a PDCCH. The DCI includes control information such as information about allocation of resources to the UE and a format thereof is designed according to application.

Control information transmitted from the UE to the eNB or control information transmitted from the eNB to the UE through uplink includes a downlink/uplink ACK/NACK signal, a channel quality indicator (CQI), a precoding matrix index (PMI), a rank indicator (RI), etc. In the case of 3GPP LTE, the UE can transmit the CQI/PMI/RI on a PUSCH and/or a PUCCH.

Figure 4:
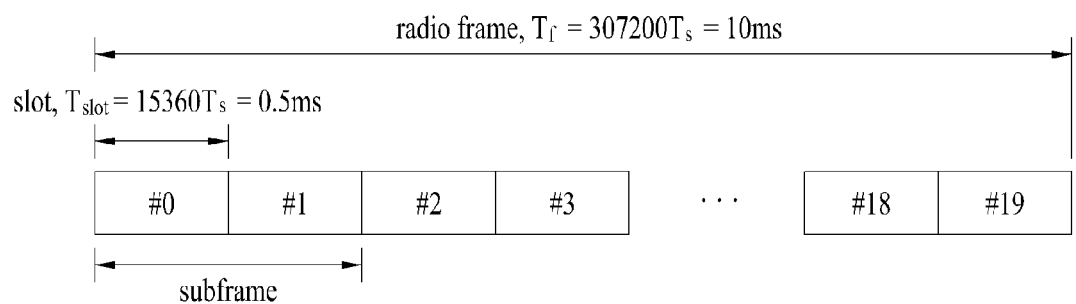
FIG. 4 illustrates a radio frame structure used in LTE.

FIG. 4 illustrates a radio frame structure used in LTE.

Referring to FIG. 4, a radio frame has a length of 10 ms (327200×Ts) and includes 10 subframes of equal size. Each subframe has a length of 1 ms and includes two slots. Each slot has a length of 0.5 ms (15360×Ts). Here, Ts denotes sampling time and is represented as Ts=1/(15 kHz× 2048)=3.2552×10$^{-8}$ (about 33 ns). Each slot includes a plurality of OFDM symbols in the time domain and a plurality of resource blocks in the frequency domain. In LTE, one resource block (RB) includes (12 subcarriers×7 (or 6) OFDM symbols). A unit time for transmitting data, a transmission time interval (TTI), may be defined based on one or more subframes. The above-described radio frame structure is exemplary and the number of subframes included in a radio frame, the number of slots included in a subframe, and the number of OFDM symbols included in a slot may be modified in various manner.

Figure 5:
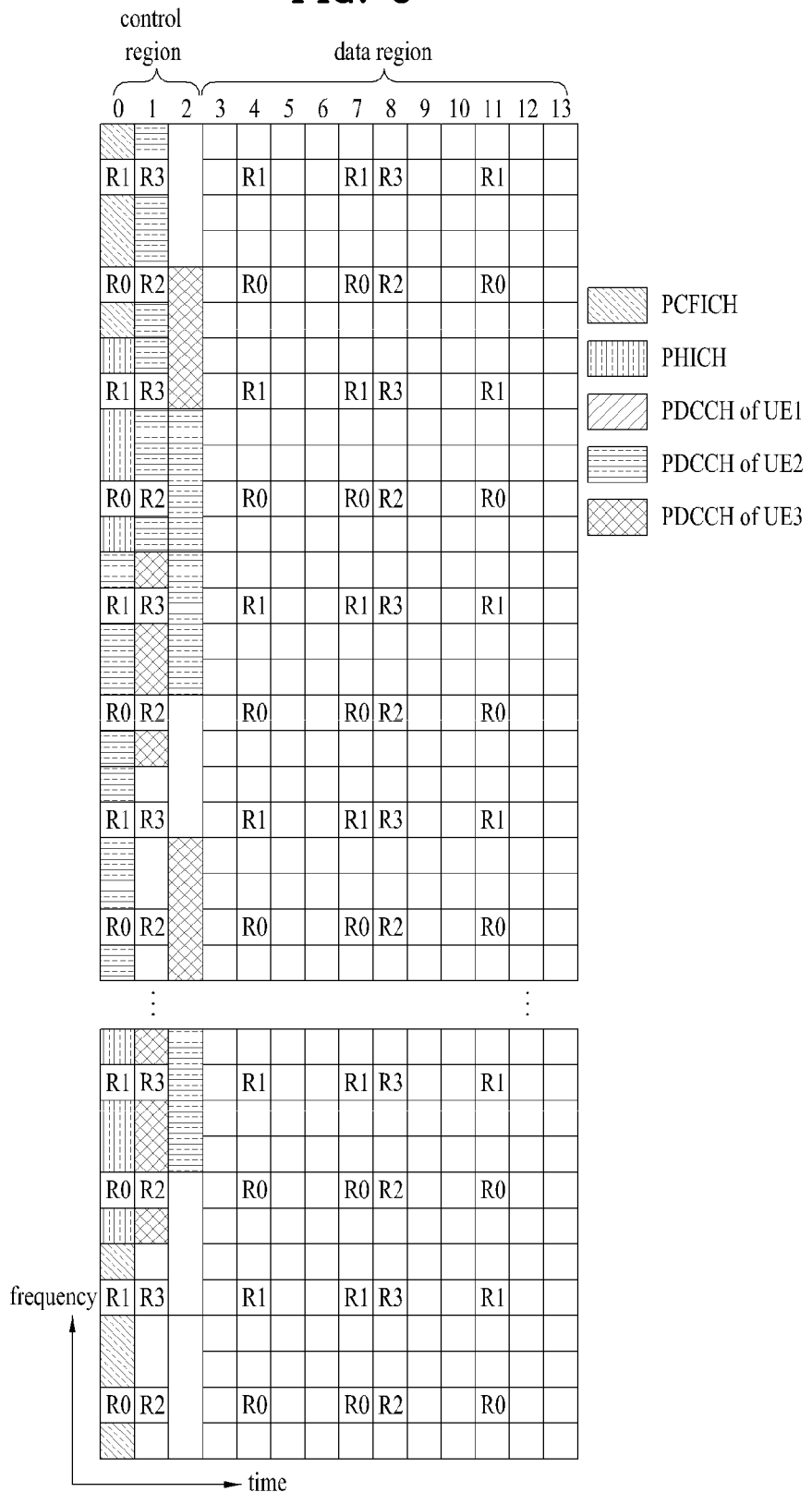
FIG. 5 illustrates a downlink radio frame structure used in LTE.

FIG. 5 illustrates control channels included in a control region of a subframe in a downlink radio frame.

Referring to FIG. 5, a subframe includes 14 OFDM symbols. One to three OFDM symbols located in a front portion of the subframe are used as a control region and the remaining eleven to thirteen OFDM symbols are used as a data region. In FIG. 5, R1 to R4 denote reference signals (RSs) or pilot signals with respect to antennas #0 to #3. RSs are fixed in a predetermined pattern within the subframe irrespective of the control region and the data region. Control channels are allocated to resources to which RSs are not assigned in the control region and traffic channels are allocated to resources to which RSs are not assigned in the data region. Control channels allocated to the control region include a physical control format indicator channel (PCFICH), a physical hybrid-ARQ indicator channel (PHICH), a physical downlink control channel (PDCCH), etc.

The PCFICH informs a UE of information regarding the number of OFDM symbols used for a PDCCH for each subframe. The PCFICH is transmitted at the first OFDM symbol and set prior to the PHICH and PDCCH. The PHICH is composed of 4 resource element groups (REGs) which are dispersed in the control region based on cell ID. One REG includes 4 resource elements (REs). An RE is a minimum physical resource defined by (a subcarrier×an OFDM symbol). PCFICH values indicate 1 to 3 or 2 to 4 according to bandwidth and modulated according to quadrature phase shift keying (QPSK).

The PHICH is a HARQ indicator channel and is used to carry HARQ acknowledgment (ACK)/negative-acknowledgment (NACK) signal for uplink transmission. That is, DL ACK/NACK information for UL HARQ is transmitted on the PHICH. The PHICH is composed of one REG and is cell-specifically scrambled. ACK/NACK is a 1-bit signal and is modulated according to binary phase shift keying (BPSK). Modulated ACK/NACK is spread with a spreading factor (SF) of 2 or 4. A plurality of PHICHs mapped to the same resource form a PHICH group. The number of PHICHs multiplexed to the PHICH group is determined by the number of spreading codes. The PHICH (group) is repeated three times to obtain diversity gain in the frequency domain and/or time domain.

The PDCCH is allocated to n OFDM symbols located in the front portion of the subframe. Here, n is an integer greater than 1 and is indicated by the PCFICH. The PDCCH is composed of one or more CCEs. The PDCCH carries information regarding resource allocation of a PCH and DL-SCH, uplink scheduling grant, HARQ information, etc. to each UE or UE group. The PCH and DL-SCH are transmitted on a PDSCH. Accordingly, an eNB and a UE generally transmit and receive data through the PDSCH except for specific control information or specific service data.

Information about one or more UEs to which data of the PDSCH will be transmitted and information about how the UEs receive and decode the PDSCH data are included in a PDCCH and transmitted. For example, if a specific PDCCH is CRC-masked with a radio network temporary identity (RNTI) "A" and information about data transmitted using a radio resource (e.g. frequency position) "B" and a DCI format "C", that is, transport format information (e.g. transport block size, modulation scheme, coding information, etc.) is transmitted through a specific subframe, a UE in a cell monitors the PDCCH using RNTI information included therein. If one or more UEs include the RNTI "A", the UEs receive the PDCCH and receive a PDSCH indicated by "B" and "C" through information of the received PDCCH.

Figure 6:
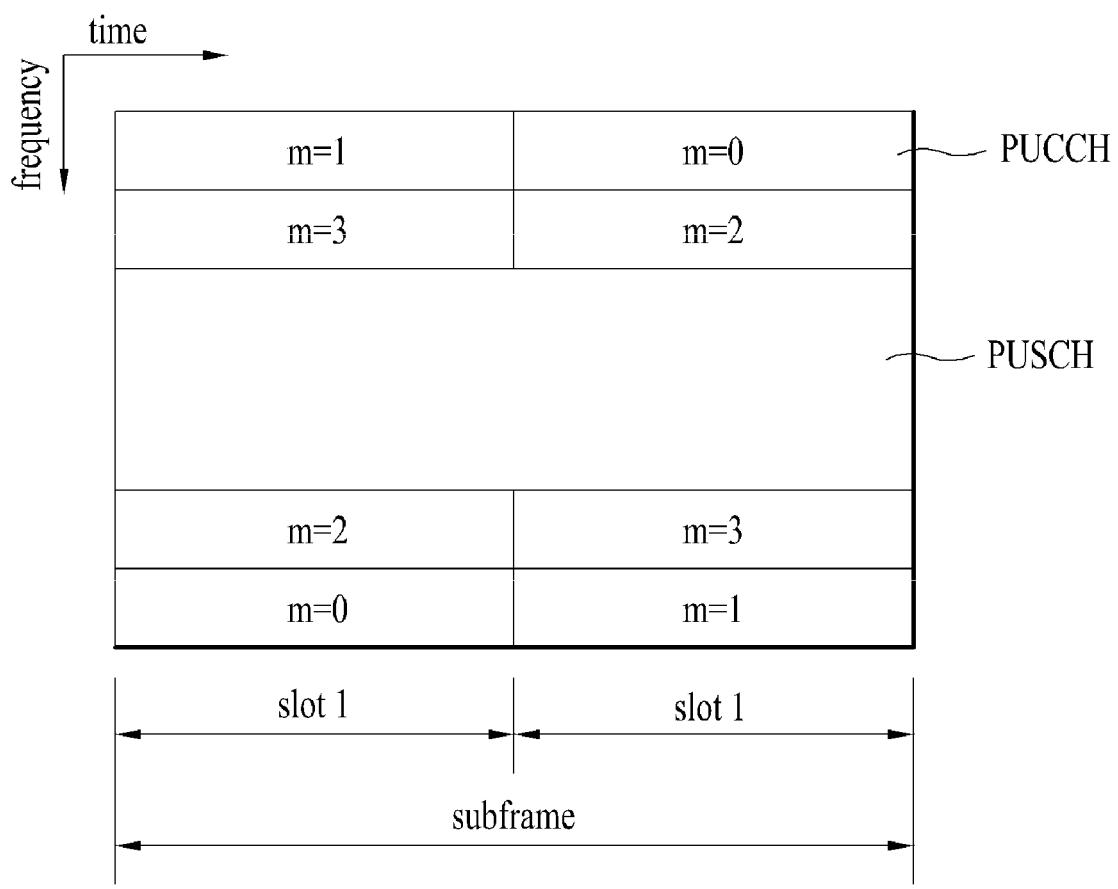
FIG. 6 illustrates an uplink radio frame structure used in LTE.

FIG. 6 illustrates an uplink subframe structure used in LTE.

Referring to FIG. 6, an uplink subframe can be divided into a region to which a physical uplink control channel (PUCCH) carrying control information is allocated and a region to which a physical uplink shared channel (PUSCH) carrying user data is allocated. The middle part of the subframe is allocated to the PUSCH and both sides of the data region in the frequency domain are allocated to the PUCCH. Control information transmitted on the PUCCH includes ACK/NACK used for HARQ, a CQI indicating a downlink channel state, an RI for MIMO, a scheduling request (SR) corresponding to an uplink resource allocation request, etc. A PUCCH for one UE uses a resource block occupying different frequencies in slots within the subframe. That is, 2 resource blocks allocated to the PUCCH are frequency hopped at the slot boundary. FIG. 6 illustrates allocation of a PUCCH with m=0, a PUCCH with m=1, a PUCCH with m=2 and a PUCCH with m=3 to the subframes.

A description will be given of a multiple-input multiple-output (MIMO) system. MIMO uses plural transmit antennas and plural receive antennas and can improve data transmission/reception efficiency. That is, the throughput and performance of a wireless communication system can be improved by using a plurality of antennas at a transmitter or a receiver of the wireless communication system. In the following, MIMO may be referred to as 'multi-antenna'.

MIMO does not depend on a single antenna path to receive a whole message. Rather, MIMO completes data by combining data fragments received through a plurality of antennas. MIMO can increase data rate within a cell area having a specific size or extend system coverage at a given data rate. MIMO is broadly applicable to mobile terminals, relays, etc. It is possible to overcome the limit of throughput of conventional mobile communication sing a single antenna through MIMO.

Figures 7, 8:
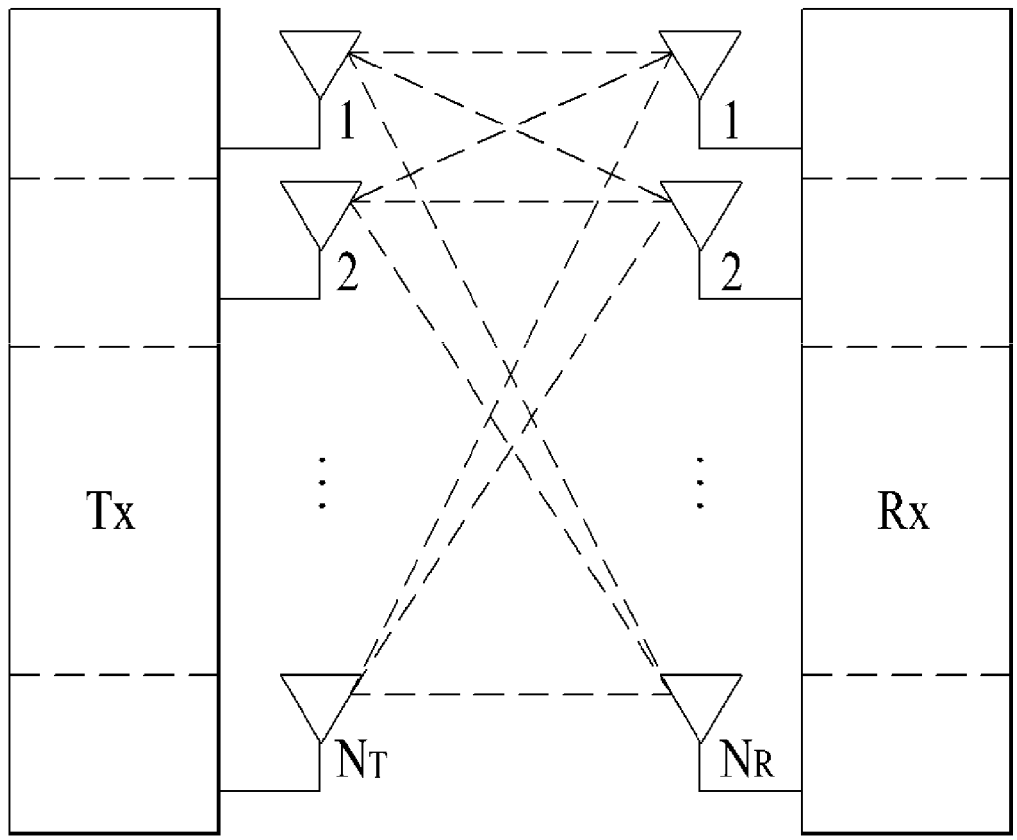
FIG. 7 illustrates a configuration of a MIMO communication system.
FIGS. 8 to 11 illustrate periodic channel state information reporting.

FIG. 7 illustrates a configuration of a typical MIMO communication system. When a transmitter uses $N_T$ transmit (Tx) antennas and a receiver uses $N_R$ receive (Rx) antennas, a theoretical channel transmission capacity is increased, compared to use of a plurality of antennas at only one of the transmitter and the receiver. Channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas. Here, $R_i$ corresponds to the smaller of $N_T$ and $N_R$.

$$R_i = \min(N_T, N_R) \quad \text{[Equation 1]}$$

For instance, a MIMO communication system with 4 Tx antennas and 4 Rx antennas may theoretically achieve a four-fold increase in transmission rate, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. As illustrated in FIG. 7, it is assumed that $N_T$ Tx antennas and $N_R$ Rx antennas are present. Regarding a transmission signal, up to $N_T$ pieces of information can be transmitted through the $N_T$ Tx antennas, as expressed by the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix physically means a maximum number of given channels through which different pieces of information can be transmitted. Accordingly, the rank of the channel matrix is defined as the lesser of the numbers of independent rows and columns. Accordingly, the rank of the channel matrix is not larger than the number of rows or columns. For example, the rank of the channel matrix H, rank(H) is limited by Equation 6.

$$\text{rank}(H) \leq \min(N_T, N_R) \quad \text{[Equation 6]}$$

Let information transmitted using MIMO be defined as 'transmission stream' or simply 'stream'. 'Stream' can also be referred to as 'layer'. The number of transmission streams cannot be larger than the channel rank. Accordingly, the channel matrix H can be expressed by Equation 7.

$$\text{\# of streams} \leq \text{rank}(H) \leq \min(N_T, N_R) \quad \text{[Equation 7]}$$

Here, "# of streams" denotes the number of streams. It is noted that one stream can be transmitted through one or more antennas.

There may be various methods for matching one or more streams to a plurality of antennas. These methods can be described according to MIMO types as follows. Transmission of one stream through a plurality of antennas can be considered as a spatial diversity scheme and transmission of a plurality of streams through a plurality of antennas can be considered as a spatial multiplexing scheme. A hybrid of the spatial diversity and spatial multiplexing is possible.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a PUCCH or a PUSCH to the UE.

CSI is categorized into an RI, PMI and CQI. The RI indicates rank information of a channel, as described above and represents the number of streams that can be received by a UE through the same time-frequency resource. The RI is determined by long term fading of the channel, and thus the RI is fed back to an eNB at a longer period than PMI and CQI.

The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

In an evolved communication system such as LTE-A, additional multi-user diversity is obtained using MU-MIMO (multi-user MIMO). Since interference is present between UEs multiplexed in the antenna domain in MU-MIMO, accuracy of CSI may largely affect not only a UE that reports the CSI but also interference of other multiplexed UEs. Accordingly, MU-MIMO requires more accurate CSI reporting than SU-MIMO.

In LTE-A, a final PMI is divided into W1 corresponding to a long-term and/or wideband PMI and W2 corresponding to a short-term and/or subband PMI.

A long-term covariance matrix of a channel, represented by Equation 8, can be used as a hierarchical codebook transformation constituting a final PMI based on W1 and W2.

$$W = \text{norm}(W1\,W2) \qquad \text{[Equation 8]}$$

In Equation 8, W2 corresponds to a short-term PMI and is a codeword of a codebook configured to reflect short-term channel state information, W is a codeword (in other words, precoding matrix) of a final codebook, and norm(A) denotes a matrix in which the norm of each column of matrix A is normalized to 1.

W1 and W2 have structures as represented by Equation 9.

$$W1(i) = \begin{bmatrix} X_i & 0 \\ 0 & X_i \end{bmatrix}, \qquad \text{[Equation 9]}$$

where $X_i$ is Nt/2 by M matrix.

$$W2(j) = \begin{bmatrix} \overbrace{e_M^k \quad e_M^l \quad e_M^m}^{r\ columns} \\ \cdots \\ \alpha_j e_M^k \quad \beta_j e_M^l \quad \gamma_j e_M^m \end{bmatrix}$$

(if rank=r), where $1 \leq k, l, m \leq M$ and k, l, m are integer. wherein Nt denotes the number of Tx antennas, M is the number of columns of a matrix X, and represents that the matrix $X_i$ includes M candidate column vectors, and $e_M^k$, $e_m^l$ and $e_M^m$ respectively indicate k-th, l-th and m-th column vectors in which only k-th, l-th and m-th elements from among M elements are 1 and the remaining elements are 0. In addition, $\alpha_j$, $\beta_j$ and $\gamma_j$ and are complex values having unit norm and represent application of phase rotation to the k-th, l-th and m-th column vectors of the matrix $X_i$. Furthermore, i is an integer greater than 0 and denotes a PMI indicating W1 and j is an integer greater than 0 and denotes a PMI indicating W2.

In the codeword structure represented by Equation 9, cross polarized antennas are used. When antenna spacing is dense, for example, when a distance between neighboring antennas is less than half a signal wavelength, correlation characteristics of a channel are reflected in the codeword structure. The cross polarized antennas can be categorized into a horizontal antenna group and a vertical antenna group which have uniform linear array (ULA) antenna characteristics and are co-located.

Therefore, correlation between antennas in each group has the same linear phase increment and correlation between antenna groups has phase rotation characteristics. Consequently, it is necessary to design the codebook by reflecting characteristics of a channel in the codebook because the codebook is composed of values obtained by quantizing the channel. For convenience of description, rank-1 codeword generated in the above-described structure is represented in Equation 10.

$$W1(i) * W2(j) = \begin{bmatrix} X_i(k) \\ \alpha_j X_i(k) \end{bmatrix} \qquad \text{[Equation 10]}$$

In Equation 10, the codeword is represented by a vector of $N_T$ (the number of Tx antennas)×1 and is composed of an upper vector $X_i(k)$ and a lower vector $\alpha_j X_i(k)$ which respectively represent correlations between horizontal antenna groups and vertical antenna groups. $X_i(k)$ is preferably represented as a vector having linear phase increment in which correlation between antennas in each antenna group is reflected and can use a DFT matrix.

As described above, CSI includes a CQI, PMI and RI although it is not limited thereto, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

FIGS. 8 to 11 illustrate periodic CSI reporting in LTE.

Referring to FIG. 8, 4 CQI reporting modes are present in LTE. Specifically, the CQI reporting modes are categorized into a wideband (WB) CQI mode and a subband (SB) CQI mode according to CQI feedback type and into a no PI mode and a single PMI mode according to whether a PMI is transmitted. Each UE receives information composed of a combination of a period and an offset through RRC signaling for periodic CQI reporting.

Figure 9:
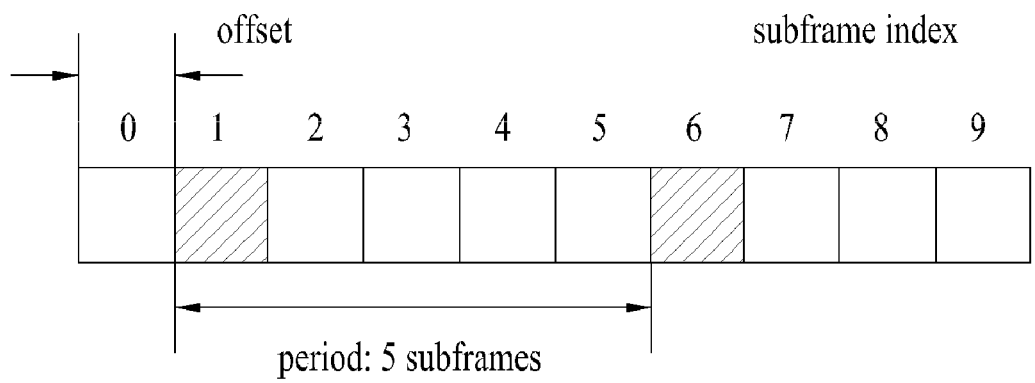

FIG. 9 illustrates an example of transmitting CSI when information representing {period '5', offset '1'} is signaled to a UE. Referring to FIG. 9, upon reception of the information representing a period of '5' and an offset of '1', the UE transmits CSI in 5 subframes with an offset corresponding to one subframe from subframe #0 in a direction in which the subframe index increases. While the CSI is basically transmitted through a PUCCH, when a PUSCH for transmitting data is present in the same time, the CSI is transmitted with the data through the PUSCH. The subframe index is composed of a system frame number $n_f$ and a slot index $n_s$ (0 to 19). Since a subframe includes two slots, the subframe index can be defined by $10*n_f + \text{floor}(n_s/2)$. Here, floor( ) denotes a floor function.

A scheme of transmitting a WB CQI only and a scheme of transmitting both the WB CQI and SB CQI are present. According to the scheme of transmitting the WB CQI only, CQI information about the overall band is transmitted in subframes corresponding to a CQI transmission period. When a PMI also needs to be transmitted according to PMI feedback type, as illustrated in FIG. 8, the PMI and CQI are transmitted together. According to the scheme of transmitting both the WB CQI and SB CQI, the WB CQI and SB CQI are alternately transmitted.

Figure 10:
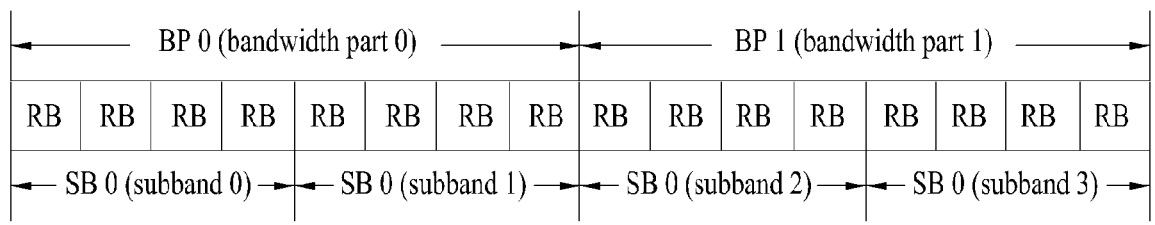
Figure 11:
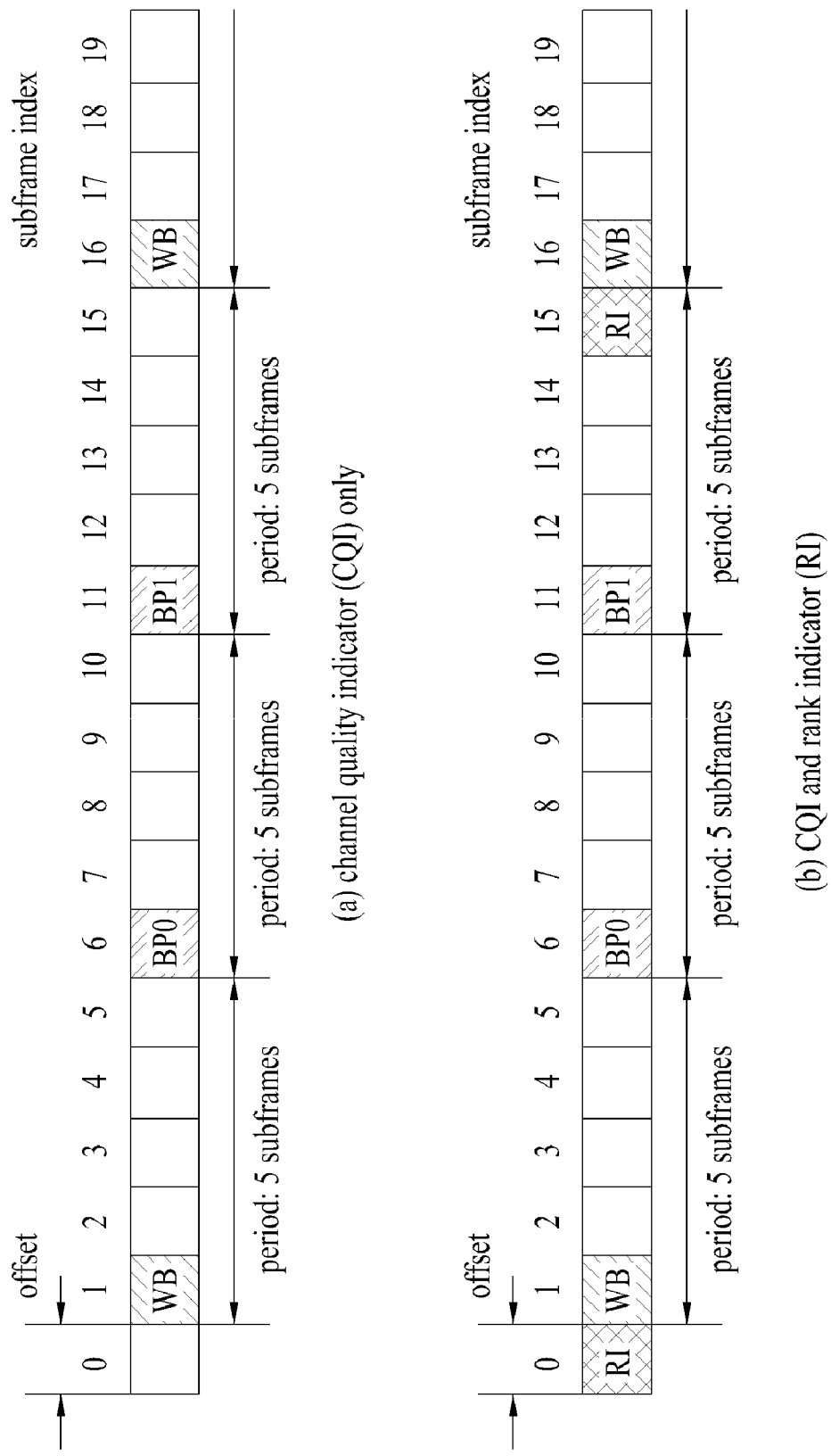

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the size of each SB may be varied according to system bandwidth. Furthermore, the number of SBs constituting each BP may depend on the number of RBs, the number of BPs and SB size.

In the case of the scheme of transmitting both the WB CQI and SB CQI, the WB CQI is transmitted in a first CQI transmission subframe and a CQI corresponding to the SB having a good channel state between SB0 and SB1 belonging to BP0 and the index of the corresponding SB are transmitted in the next CQI transmission subframe. Then, a CQI corresponding to the SB in good channel state between SB0 and SB1 belonging to BP1 and the index of the corresponding SB are transmitted in the next CQI transmission subframe. In this manner, the WB CQI is transmitted and then CQI information about respective BPs is sequentially transmitted. CQI information about BPs can be sequentially transmitted one to four times between two WB CQIs. For example, if CQI information about BPs is sequentially transmitted once between two WB CQIs, the CQI information can be transmitted in the order of WB CQI=>BP0 CQI=>BP1 CQI=>WB CQI. If CQI information about BPs is sequentially transmitted four times between two WB CQIs, the CQI information can be transmitted in the order of WB CQI=>BP0 CQI=>BP1 CQI=>BP0 CQI=>BP1 CQI=>BP0 CQI=>BP1 CQI=>BP0 CQI=>BP1 CQI=>WB CQI. Information about how many times each BP CQI is sequentially transmitted is signaled by a higher layer (e.g. RRC layer).

FIG. 11(a) illustrates an example of transmitting both the WB CQI and SB CQI when information representing {period '5', offset '1'} is signaled to a UE. Referring to FIG. 11(a), a CQI can be transmitted only in subframes corresponding to a signaled period and offset irrespective of CQI type. FIG. 11(b) illustrates a case in which an RI is additionally transmitted. The RI can be signaled by a higher layer (e.g. RRC layer) as a combination of information about a multiple of the WB CQI transmission period, which corresponds to an RI transmission period, and an offset in the RI transmission period. The offset of the RI is signaled as a value relative to the offset of the CQI. For example, if the offset of the CQI is '1' and the offset of the RI is '0', the RI has the same offset as that of the CQI. The offset of the RI is defined as 0 or a negative value. Specifically, FIG. 11(b) assumes a case in which the RI transmission period is equal to the WB CQI transmission period and the offset of the RI is '−1' in the same environment as FIG. 11(a). The RI transmission period is identical to the WB CQI transmission period since the RI transmission period is equal to the WB CQI transmission period. The offset of the RI is '−1', and thus the RI is transmitted on the basis of '−1' (i.e. subframe #0) with respect to the CQI offset '1'. When the RI offset is '0', the WB CQI transmission subframe and RI transmission subframe overlap. In this case, the WB CQI is dropped and the RI is transmitted.

Figure 12:
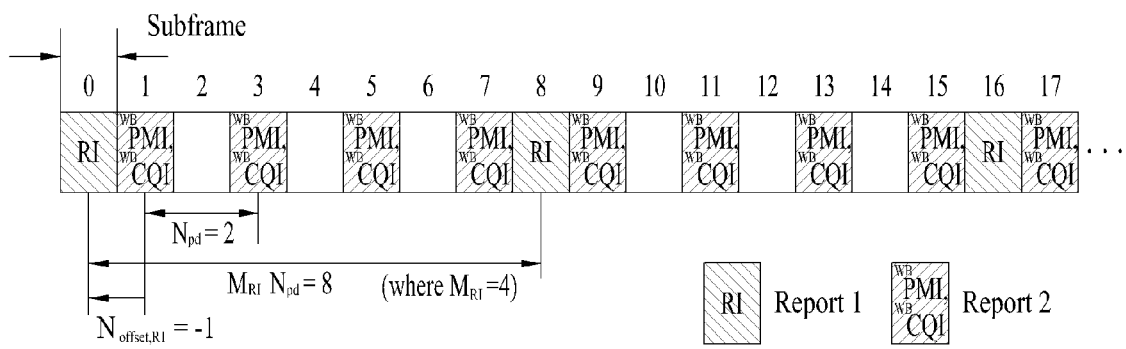
FIGS. 12 and 13 illustrate processes of periodically reporting channel state information when a non-hierarchical codebook is used.

FIG. 12 illustrates CSI feedback in the case of mode 1-1 of FIG. 8.

Referring to FIG. 12, CSI feedback is achieved by transmission of two types of report content, Report 1 and Report 2. Specifically, an RI is transmitted through Report 1 and a wideband (WB) PMI and a WB CQI are transmitted through Report 2. Report 2 is transmitted in a subframe corresponding to a subframe index that satisfies $(10*n_f + \text{floor}(n_s/2) - N_{offset,CQI}) \mod (N_{pd}) = 0$. $N_{offset,CQI}$ corresponds to the offset value for PMI/CQI transmission, illustrated in FIG. 9, and FIG. 12 illustrates a case in which $N_{offset,CQI} = 1$. $N_{pd}$ denotes a subframe spacing between neighboring Reports 2 and FIG. 12 illustrates a case in which $N_{pd} = 2$. Report 1 is transmitted in a subframe corresponding to a subframe index that satisfies $(10*n_f + \text{floor}(n_s/2) - N_{offset,CQI} - N_{offset,RI}) \mod (M_{RI} \cdot N_{pd}) = 0$. $M_{RI}$ is determined by higher layer signaling and $N_{offset,RI}$ corresponds to the relative offset value for RI transmission, illustrated in FIG. 11. FIG. 12 illustrates a case in which $M_{RI} = 4$ and $N_{offset,RI} = -1$.

Figure 13:
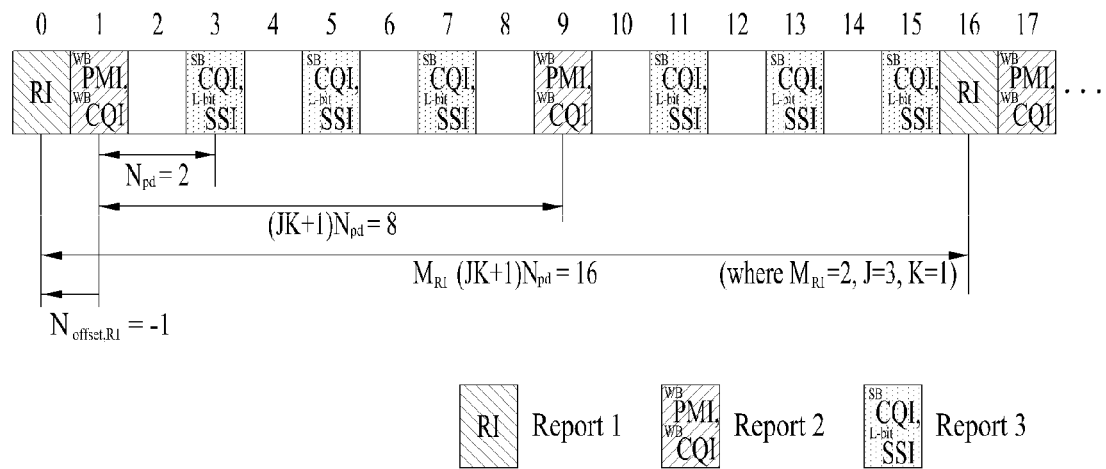

FIG. 13 illustrates CSI feedback in the case of mode 2-1 of FIG. 8.

Referring to FIG. 13, CSI feedback is achieved by transmission of three types of report content, Report 1, Report 2 and Report 3. Specifically, an RI is transmitted through Report 1, a WB PMI and a WB CQI are transmitted through Report 2 and a subband (SB) CQI and an L-bit subband selection indicator (SSI) are transmitted through Report 3. Report 2 or Report 3 is transmitted in a subframe corresponding to a subframe index that satisfies $(10*n_f + \text{floor}(n_s/2) - N_{offset,CQI}) \mod (N_{pd}) = 0$. Particularly, Report 2 is transmitted in a subframe corresponding to a subframe index that satisfies $(10*n_f + \text{floor}(n_s/2) - N_{offset,CQI}) \mod (H \cdot N_{pd}) = 0$. Accordingly, Report 2 is transmitted at an interval of $H \cdot N_{pd}$ and subframes disposed between neighboring Reports 2 are used to transmit Report 3. In this case, $H = J \cdot K + 1$ where J is the number of bandwidth parts (BPs). K indicates the number of continuously performed full cycles each of which carries out a process for selecting a subband from each BP and transmitting the selected subband for all BPs and is determined through higher layer signaling. FIG. 13 illustrates a case in which $N_{pd} = 2$, $J = 3$ and $K = 1$. Report 1 is transmitted in a subframe corresponding to a subframe index that satisfies $(10*n_f + \text{floor}(n_s/2) - N_{offset,CQI} - N_{offset,RI}) \mod (M_{RI}(J \cdot K + 1) \cdot N_{pd}) = 0$. FIG. 13 illustrates a case in which $M_{RI} = 2$ and $N_{offset,RI} = -1$.

FIG. 14 illustrates periodic CSI reporting, which is being discussed in LTE-A. In the case of mode X-1, LTE-A sets a precoder type indication (PTI) parameter which is a 1-bit indicator and considers two types of subdivided periodic reporting modes according to PTI values, as illustrated in FIG. 14. In FIG. 14, W1 and W2 are codewords constituting a hierarchical codebook described with reference to Equations 8 and 9. Both W1 and W2 need to be determined in order to set a precoding matrix W accomplished by combining W1 and W2.

Referring to FIG. 14, in the case of periodic reporting, different reports corresponding to Report 1, Report 2 and Report 3 are transmitted in different repetition periods. Report 1 reports an RI and a 1-bit PTI value. Report 2 reports WB W1 (when PTI=0) or WB W2 and a WB CQI (when PTI=1). Report 3 reports WB W2 and WB CQI (when PTI=0) or SB W2 and SB CQI (when PTI=1).

Report 2 and Report 3 are transmitted in subframes (referred to as a first subframe set for convenience) having subframe indices that satisfy $(10*n_f + \text{floor}(n_s/2) - N_{offset,CQI})$ mod $(N_c) = 0$. $N_{offset,CQI}$ corresponds to the offset value illustrated in FIG. 9 and $N_c$ denotes a subframe spacing between neighboring Reports 2 or Reports 3. FIG. 14 illustrates a case in which $N_{offset,CQI}=1$ and $N_c=2$. The first subframe set is composed of subframes having odd-numbered indices. Furthermore, $n_f$ denotes a system frame number (or radio frame index), $n_s$ denotes a slot index in a radio frame, floor( ) represents a floor function and 'A mod B' represents the remainder obtained by dividing A by B.

Report 2 is located in some subframes in the first subframe set and Report 3 is located in the remaining subframes. Specifically, Report 2 is located in subframes having subframe indices that satisfy $(10*n_f + \text{floor}(n_s/2) - N_{offset,CQI})$ mod $(H \cdot N_c) = 0$. Accordingly, Report 2 is transmitted at an interval of $H \cdot N_c$ and one or more first subframes disposed between neighboring Reports 2 are used to transmit Report 3. When PTI=0, H=M and M is determined by higher layer signaling. FIG. 14 illustrates a case in which M=2. When PTI=1, H=J·K+1, K is determined by higher layer signaling and J denotes the number of BPs. FIG. 14 illustrates a case in which J=3 and K=1.

Report 1 is transmitted in subframes having subframe indices that satisfy $(10*n_f + \text{floor}(n_s/2) - N_{offset,CQI} - N_{offset,RI})$ mod $(M_{RI}(J \cdot K+1) \cdot N_c) = 0$. $M_{RI}$ is determined by higher layer signaling. $N_{offset,RI}$ denotes a relative offset value for an RI. FIG. 12 illustrates a case in which $M_{RI}=2$ and $N_{offset,RI}=-1$. Report 1 transmission timing does not correspond to Report 2 transmission timing according to $N_{offset,RI}=-1$. When a UE calculates the RI, W1 and W2, the RI, W1 and W2 are related to one another. For example, W1 and W2 are calculated based on the RI and W2 is calculated based on W1. Upon reporting of Report 2 and Report 3 after Report 1, the corresponding eNB can be aware of a final W from W1 and W2.

LTE-A is expected to support coordinated multi-point (CoMP) transmission, which was not supported in any legacy standards, in order to improve data transmission rate. CoMP transmission refers to a scheme through which two or more transmission points (e.g. eNBs or cells) communicate with UEs in cooperation with each other to improve the performance of communication between a UE and an eNB (cell or sector) located in a shadow area.

CoMP transmission schemes may be categorized into joint processing (CoMP-JP) in the form of coordinated MIMO through data sharing and scheduling/beamforming (CoMP-CS/CB).

In the case of downlink, a UE can simultaneously receive data from plural eNBs that perform CoMP transmission and improve reception performance by combining signals received from the eNBs according to CoMP-JP (Joint transmission (JT)). A method by which one of eNBs that perform CoMP transmission transmits data to the UE at a specific time (dynamic point selection (DPS)) may be considered. According to CoMP-CS/CB, the UE can instantaneously receive data from an eNB, that is, a serving eNB through beamforming.

When CoMP-JP is applied to uplink transmission, a plurality of eNBs can simultaneously receive a PUSCH signal from a UE (Joint Reception (JR)). In the case of CoMP-CS/CB, only one eNB can receive a PUSCH. Employment of CoMP-CS/CB can be determined by coordinated cells (or eNBs).

Figure 15:
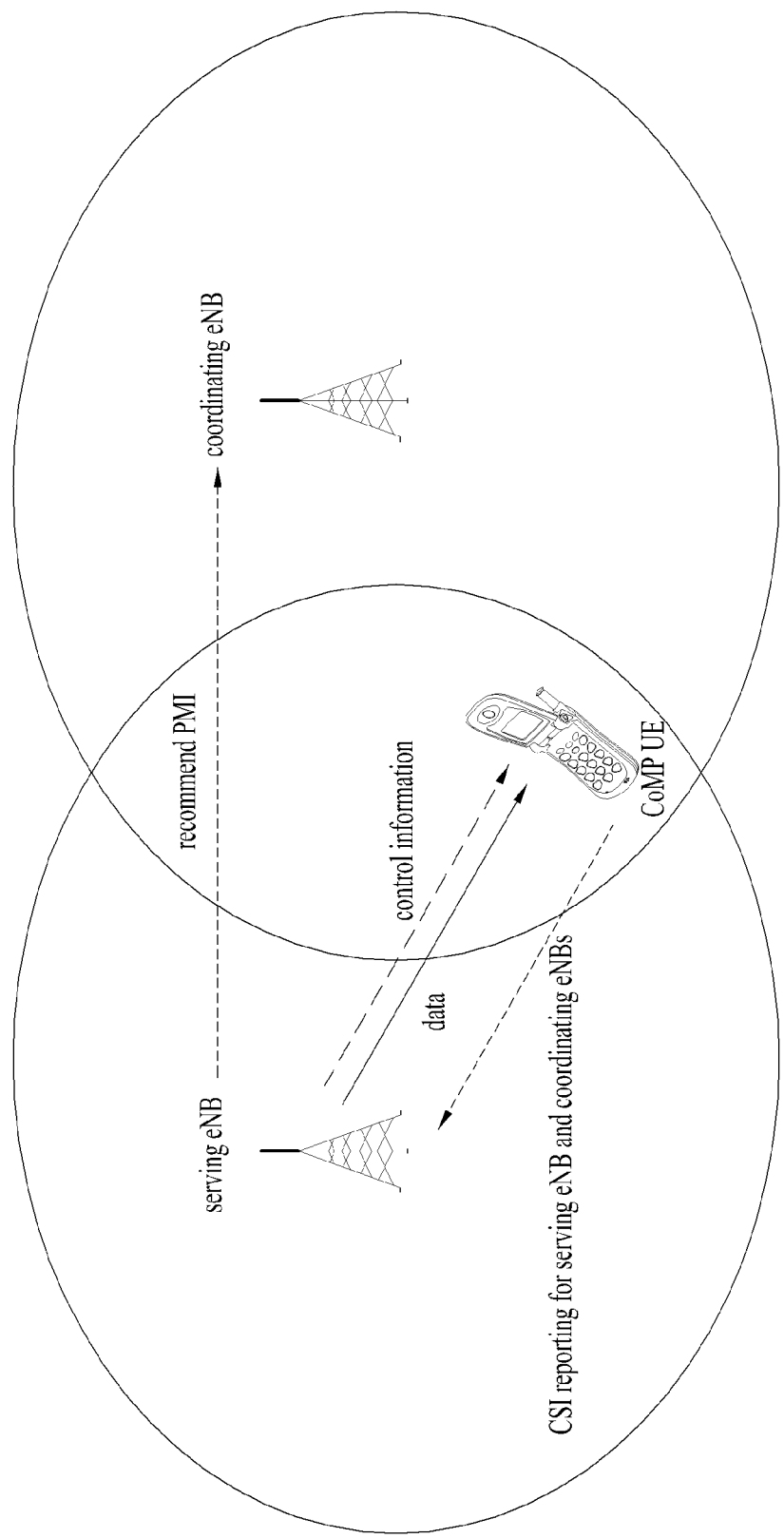
FIG. 15 illustrates a coordinated multi-point coordinated beamforming (CoMP-CB) operation.

FIG. 15 illustrates an exemplary CoMP CB operation. In FIG. 15, a UE, i.e., a CoMP UE receives control information from a serving eNB (s-eNB) to operate and receives data only from the s-eNB. The CoMP UE can estimate radio channels from a c-eNB as well as the s-eNB and report CSI feedback for each eNB to the s-eNB. The s-eNB can transmit PMI recommendation information to the c-eNB on the basis of a reported PMI for the c-eNB. The c-eNB can perform beam avoidance and precoding for the same to minimize interference applied to the CoMP UE using the PMI recommendation information.

While FIG. 15 illustrates only one c-eNB, the present invention is applicable to a coordinating set including a plurality of c-eNBs. Furthermore, the present invention can be applied to not only inter-site CoMP in which an s-eNB and a c-eNB are located at a distance from each other, as illustrated in FIG. 15, but also intra-site CoMP in which eNBs (or cells) in a coordinating set are geographically co-located or heterogeneous networks including a hybrid of inter-site CoMP and intra-site CoMP.

A description will be given of a periodic CSI reporting scheme for periodically feeding back CSI of each cell in a coordinating set when a UE is configured in CS/CB mode in CoMP operation. The periodic CSI feedback scheme proposed by the present invention can selectively perform fallback into non-CoMP operation of a serving eNB as necessary in addition to CoMP operation. Furthermore, the present invention is applicable to a case in which channel information of each cell in a coordinating set is fed back based on SB CSI as well as WB CSI. While periodic CSI report is assumed to be transmitted through PUCCH format 2/2a/2b for convenience, types of physical channels carrying periodic CSI report are not limited.

Embodiment 1

Non-Hierarchical PMI

In the present embodiment, single-cell based feedback mode 1-1 and mode 2-1 are extended to a CoMP feedback scheme for CB operation. Specifically, the Report 2 transmission period $N_{pd}$ with respect to the s-eNB in mode 1-2 corresponding to the WB CSI reporting scheme illustrated in FIG. 12 may be modified as follows in the CoMP mode.

$$(1+N_{CoMP}) \cdot N_{pd} \qquad \text{[Equation 11]}$$

Here, $N_{pd}$ is as defined above and $N_{CoMP}$ is an integer greater than 1.

Equation 11 represents the Report 2 transmission period for the s-eNB in the CoMP mode of mode 1-1. That is, a WB reporting period of $1+N_{CoMP}$ corresponding to WB CSI for the s-eNB and c-eNB(s) can be secured by adding a WB CSI report transmission period for the c-eNB(s), which corresponds to $N_{CoMP}$ reporting instance(s). Accordingly, the s-eNB can perform wideband beam avoidance by recommending a PMI for CB to each c-eNB on the basis of WB CSI for each c-eNB, which is reported to the s-eNB.

The Report 1 transmission period $M_{RI} \cdot N_{pd}$ in mode 1-1 may be modified as follows in the CoMP mode.

$$M_{RI} \cdot (1+N_{CoMP}) \cdot N_{pd} \qquad \text{[Equation 12]}$$

Here, $M_{RI}$, $N_{pd}$ and $N_{CoMP}$ are as defined above.

Report 2 transmission period $(J \cdot K+1) \cdot N_{pd}$ with respect to the s-eNB in mode 2-1 corresponding to the SB CSI reporting scheme illustrated in FIG. 13 may be modified as follows in the CoMP mode.

$$(J \cdot K+1+N_{CoMP}) \cdot N_{pd} \qquad \text{[Equation 13]}$$

Here, J, K, $N_{pd}$ and $N_{CoMP}$ are as defined above.

Equation 13 represents the Report 2 transmission period for the s-eNB in the CoMP mode of mode 2-1. In the case of SB CSI reporting, a WB reporting period of $1+N_{CoMP}$ corresponding to WB CSI for the s-eNB and c-eNB(s) can be secured in addition to an SB CSI reporting period of J=K by adding a WB CSI report transmission period for the c-eNB(s), which corresponds to $N_{CoMP}$ reporting instance(s). Accordingly, the s-eNB can perform wideband beam avoidance by recommending a PMI for CB to each c-eNB on the basis of WB CSI for each c-eNB, which is reported to the s-eNB. Furthermore, the s-eNB can select the reported WB CSI of each c-eNB and SB CSI for the s-eNB, which maximizes CoMP CB performance, from feedback information of the SB CSI reporting period for the s-eNB. The Report 1 transmission period $M_{RI} \cdot (J \cdot K+1) \cdot N_{pd}$ in mode 2-1 may be modified as follows in the CoMP mode.

$$M_{RI} \cdot (J \cdot K+1+N_{CoMP}) \cdot N_{pd} \qquad \text{[Equation 14]}$$

Here, $M_{RI}$, J, K, $N_{pd}$ and $N_{CoMP}$ are as defined above.

Embodiment 1 will now be described in more detail with reference to the attached drawings. In the following description, the number of c-eNBs in a coordinating set is defined as C. Specifically, available feedback patterns and methods therefor according to schemes of defining $N_{CoMP}$ will now be described.

Scheme 1-1: Stand-Alone Transmission of WB PMI for Each c-eNB ($N_{CoMP}=C+\alpha$)

Figure 16:
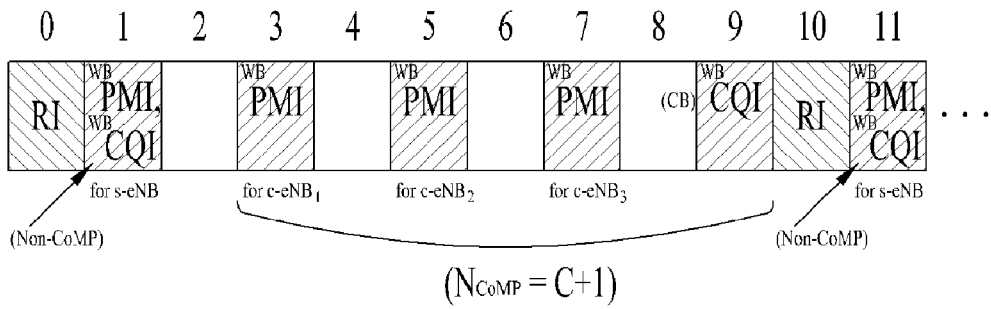
FIGS. 16 to 24 illustrate processes of periodically reporting channel state information when a non-hierarchical codebook is used according to an embodiment of the present invention.
Figure 17:
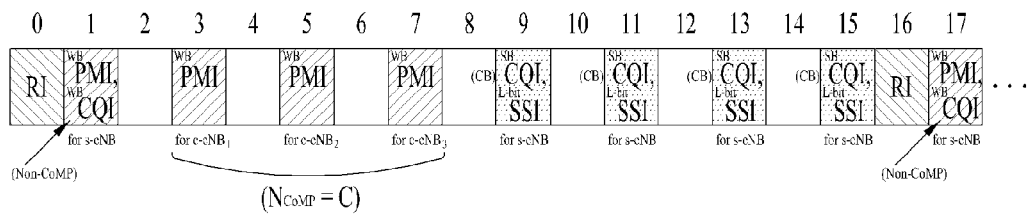

FIGS. 16 and 17 illustrate CoMP CSI feedback according to scheme 1-1. FIG. 16 illustrates a modification of mode 1-1 (WB CSI reporting) for CoMP feedback and FIG. 17 illustrates a modification of mode 2-1 (SB CSI reporting) for CoMP feedback.

FIG. 16 shows a case in which C=3, $\alpha=1$, $N_{pd}=2$ and $M_{RI}=1$ in mode 1-1 (WB CSI reporting). Referring to FIG. 16, WB PMIs for c-eNBs are independently transmitted in subframes corresponding to SI (Subframe Index)=3, 5 and 7 and $N_{pd}=C+\alpha=4$ is applied to Equations 11 and 12 to determine a transmission period. When the WB PMIs for the c-eNBs are respectively transmitted in subframes corresponding to SI=3, SI=5 and SI=7 as illustrated in FIG. 16, highly secure coding is possible compared to transmission of PMI+CQI. Specifically, since a maximum payload allocated to a reporting instance of PUCCH-based periodic CSI feedback, which is being discussed in LTE-A, is 11 bits and the maximum number of bits is 4 based on a rank during stand-alone transmission of a WB PMI, high protection coding can be achieved due to low payload size in the case of stand-alone transmission of a WB PMI for each c-eNB. That is, beam avoidance can be maximized by feeding back WB PMIs for c-eNBs with higher reliability for CoMP CB. A CB CQI value in which a gain when all the c-eNB$_1$, c-eNB$_2$ and c-eNB$_3$ perform CB is reflected can be used as a CQI transmitted in a subframe corresponding to SI=9, for example. A portion in which a CB CQI is separately transmitted corresponds to $\alpha=1$ and a may increase when additional feedback content is required for CoMP.

FIG. 17 illustrates a case in which C=3, $\alpha=0$, $N_{pd}=2$, J=4, K=1 and $M_{RI}=1$ in mode 2-1 (SB CSI reporting). Referring to FIG. 17, WB PMIs for c-eNBs are independently transmitted in subframes corresponding to SI=3, SI=5 and SI=7 and $N_{CoMP}=C=3$ is applied to Equation 13 and 14 to determine transmission period. When the WB PMIs for the c-eNBs for CoMP CB are respectively transmitted in subframes corresponding to SI=3, SI=5 and SI=7 as illustrated in FIG. 17, reliable feedback can be ensured to maximize beam avoidance. In this case, a UE can select optimal subbands for the s-eNB such that CoMP CB performance is maximized and transmit a corresponding CB CQI and SSI in subframes corresponding to SI=9, SI=11, SI=13 and SI=15 on the basis of WB CSI of the c-eNBs in the subframes corresponding to SI=3, SI=5 and SI7. In the present embodiment, since the CB CQI is transmitted as an SB report for the s-eNB in the subframes corresponding to SI=9, SI=11, SI=13 and SI=15, an additional WB CB CQI need not be transmitted as in FIG. 16 and thus $\alpha=0$ is applicable. Here, CB CQI may represent a CQI value in which a gain when all c-eNB$_1$, c-eNB$_2$ and c-eNB$_3$ perform CB is reflected, for example. The SSI is a parameter indicating a subband selected from subbands in a bandwidth part (BP). If a subband is selected according to a predetermined/signaled pattern (or cycling), SSI transmission can be omitted.

FIGS. 16 and 17 illustrate examples for aiding in description of scheme 1-1 and detailed report content in FIGS. 16 and 17 may be modified into the following various combinations. That is, various types of report content shown in Tables 1 and 2 in addition to the above-described report content can be transmitted in corresponding subframes. Table 1 illustrates WB report content for c-eNBs, which can be transmitted in FIGS. 16 and 17, and Table 2 illustrates SB report content for c-eNBs, which can be transmitted in FIG. 17.

TABLE 1

|  | SI = 3 | SI = 5 | SI = 7 | Notes |
|---|---|---|---|---|
| Example 1 | WB PMI for c-eNB1 | WB PMI for c-eNB2 | WB PMI for c-eNB3 | Identical to example of FIG. 16 (WB CB CQI needs to be transmitted in subframe corresponding to SI = 9) |
| Example 2 | WB PMI for c-eNB1 WB CB CQI (s-eNB, c-eNB1) | WB PMI for c-eNB2 WB CB CQI (s-eNB, c-eNB1, c-eNB2) | WB PMI for c-eNB3 WB CB CQI (s-eNB, c-eNB1, c-eNB2, c-eNB3) | Transmission in subframe corresponding to SI = 9 is not necessary because WB CB CQI is also transmitted. |
| Example 3 | WB PMI for c-eNB1 WB CB CQI (s-eNB, c-eNB1) | WB PMI for c-eNB2 WB CB CQI (s-eNB, c-eNB2) | WB PMI for c-eNB3 WB CB CQI (s-eNB, c-eNB3) | WB CQI when all c-eNBs participate in CB can be additionally transmitted in subframe corresponding to SI = 9. |

In Table 1, s-eNB and c-eNB(s) described in parentheses for each WB CB CQI for each c-eNB denote an s-eNB and c-eNB(s) that participate in CB during CB CQI calculation. For example, in example 2 of Table 1, WB CB CQI (s-eNB, c-eNB1) corresponding to SI=3 represents a CQI when the s-eNB and c-eNB1 participate in CB, WB CB CQI (s-eNB, c-eNB1, c-eNB2) corresponding to SI=5 represents a CQI when the s-eNB, c-eNB1 and c-eNB2 participate in CB, and WB CB CQI (s-eNB, c-eNB1, c-eNB2, c-eNB3) corresponding to SI=7 represents a CQI when the s-eNB, c-eNB1, c-eNB2 and c-eNB3 participate in CB.

TABLE 2

| | Report content to be transmitted in subframes corresponding to SI = 9, 11, 13 and 15 | Notes |
| --- | --- | --- |
| Example 1 | SB CB CQI, SSI | Identical to example of FIG. 17. (WB PMI transmitted in subframe of SI = 1 is used as PMI for s-eNB) |
| Example 2 | SB CB CQI | SB selected and applied according to predetermined/signaled pattern (or cycling) and SSI is omitted. |
| Example 3 | SB PMI, SB CB CQI, SSI | SB PMI that maximizes CB performance for reported WB PMIs for c-eNB(s) is calculated and transmitted. |
| Example 4 | SB PMI, SB CB CQI | SB selected and applied according to predetermined/signaled pattern (or cycling) and SSI is omitted. |

In example 3 and example 4 of Table 2, SB PMIs for the s-eNB in subframes corresponding to SI=9, SI=11, SI=13 and SI=15 are determined such that CoMP CB performance is maximized on the basis of WB CSI of c-eNB(s), reported in subframes corresponding to SI=3, SI=5 and SI=7, and the SB PMIs are transmitted along with corresponding CB CQIs. That is, a UE can determine a PMI for the s-eNB per SB on the assumption that WB PMIs for the c-eNB(s), which are reported first, are used by the s-eNB/c-eNB(s). In the case of example 3, the quantity of transmitted information may exceed a maximum payload size since the SSI is transmitted in addition to the PMI. In this case, to reduce the quantity of transmitted information, a sub-sampled SB PMI selected from an SB PMI subset corresponding to part of an SB PMI set may be used or a delta (Δ) CQI corresponding to a difference between a normal SB CB CQI and a non-CoMP CQI in the subframe corresponding to SI=1 may be used.

Scheme 1-2: Transmission of Plural WB PMIs for Each c-eNB ($N_{CoMP}=C+\alpha$)

Figure 18:
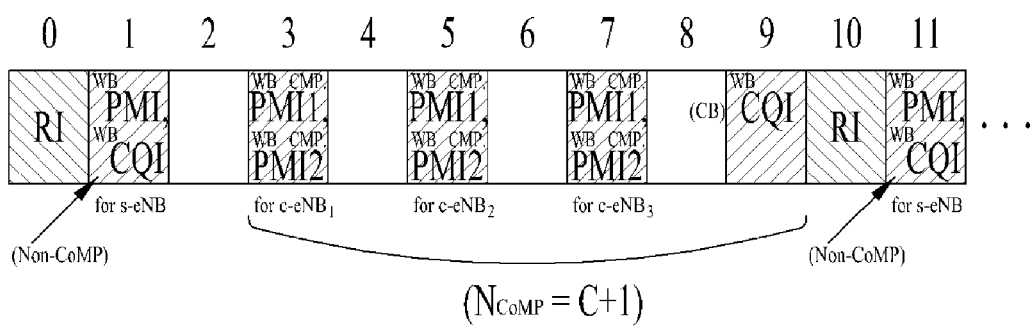
Figure 19:
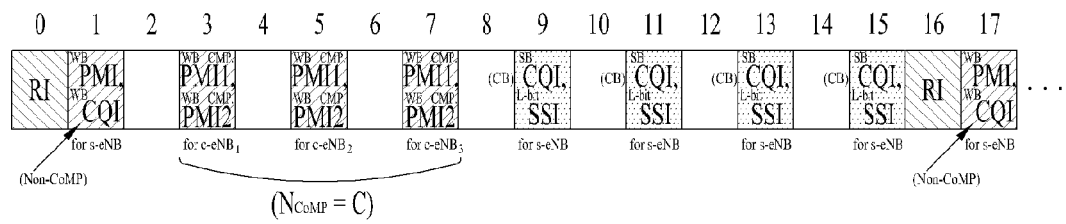

FIGS. 18 and 19 illustrate CoMP CSI feedback according to scheme 1-2. FIG. 18 illustrates a modification of mode 1-1 (WB CSI reporting) for CoMP feedback and FIG. 19 illustrates a modification of mode 2-1 (SB CSI reporting) for CoMP feedback.

Scheme 1-2 includes scheme 1-1 and simultaneously transmits a plurality of WB companion (CMP.) PMIs per c-eNB in subframes corresponding to SI=3, SI=5 and S7 as illustrated in FIGS. 18 and 19. While FIGS. 18 and 19 illustrate simultaneous transmission of two CMP PMIs (SB CMP. PMI1 and WB CMP. PMI2), this is exemplary and the present invention may transmit three or more CMP. PMIs at a time. Report content corresponding to WB CMP. PMI1 and WB CMP. PMI2 may be combined in various manners as shown in Table 3. Table 3 illustrates transmittable WB report content for c-eNBs.

TABLE 3

| | Report content to be transmitted in subframes corresponding to SI = 3, 5 and 7 | |
| --- | --- | --- |
| | WB companion (CMP.) PMI1 | WB CMP. PMI2 |
| Example 1 | Best CMP. PMI | Worst CMP. PMI |
| Example 2 | Best CMP. PMI | Best CMP. PMI (or "second-best CMP. PMI) |
| Example 3 | Worst CMP. PMI | Worst CMP. PMI (or "second-worst CMP. PMI) |

Example 1 of Table 3 shows a case in which a best CMP. PMI and a worst CMP. PMI are simultaneously fed back (e.g. in the same subframe). Here, the best CMP. PMI refers to a PMI for a c-eNB, which provides best CB performance during CB performed with a PMI for the s-eNB, whereas the worst CMP. PMI refers to a PMI for a c-eNB, which provides worst CB performance during CB performed with the PMI for the s-eNB. A c-eNB can use information corresponding thereto such that a reported worst CMP. PMI is selected as infrequently as possible. Example 2 shows a case in which two best CMP. PMIs are simultaneously fed back. In this case, a best CMP. PMI may be fed back twice in a reporting instance (e.g. a subframe) or a best CMP. PMI and a second-best CMP. PMI may be simultaneously fed back in a reporting instance (e.g. a subframe) such that a CMP. PMI selected by a c-eNB is not fixed to a specific one. Here, a best CMP. PMI can be fed back twice when the second-best CMP. PMI is not satisfactory. Example 3 shows a case in which a worst CMP. PMI is fed back twice or a worst CMP. PMI and a second-worst CMP. PMI are simultaneously fed back.

In Table 3, WB CMP. PMI and WB CMP. PMI2 are content simultaneously transmitted in a reporting instance without priority and thus descriptions of WB CMP. PMI and WB CMP. PMI2 in Table 3 may be interchangeable. When three or more CMP. PMIs are fed back in a reporting instance, WB CMP. PMI3, WB CMP. PMI4, . . . may be added to Table 3, as is shown in Table 4. Examples 1, 2 and 3 in Table 4 are identical to those of Table 3. As shown in Table 4, when WB CMP. PMI3 is added, corresponding PMIs illustrated in Table 4 are applicable. When WB CMP. PMI4 is added, corresponding PMIs illustrated in Table 4 are applicable. In this manner, the scheme of transmitting a CMP. PMI can be normalized and extended when the number of CMP. PMIs is increased.

TABLE 4

| | Report content to be transmitted in subframes corresponding to SI = 3, 5 and 7 | | | |
| --- | --- | --- | --- | --- |
| | WB CMP. PMI1 | WB CMP. PMI2 | WB CMP. PMI3 | WB CMP. PMI4 |
| Example 1 | Best CMP. PMI | Worst CMP. PMI | | |
| Example 2 | Best CMP. PMI | Best CMP. PMI (or "second-best" CMP. PMI) | | |

TABLE 4-continued

Report content to be transmitted in subframes corresponding to SI = 3, 5 and 7

| | WB CMP. PMI1 | WB CMP. PMI2 | WB CMP. PMI3 | WB CMP. PMI4 |
|---|---|---|---|---|
| Example 3 | Worst CMP. PMI | Worst CMP. PMI (or "second-worst" CMP. PMI) | | |
| Example 4 | Best CMP. PMI | Worst CMP. PMI | Best CMP. PMI (or "second-best" CMP. PMI) | Best CMP. PMI (or "third-best" CMP. PMI) |
| Example 5 | Best CMP. PMI | Worst CMP. PMI | Worst CMP. PMI (or "second-worst" CMP. PMI) | Worst CMP. PMI (or "third-worst" CMP. PMI) |
| Example 6 | Best CMP. PMI | Worst CMP. PMI | Best CMP. PMI (or "second-best" CMP. PMI) | Worst CMP. PMI (or "second-worst" CMP. PMI) |
| Example 7 | Best CMP. PMI | Worst CMP. PMI | Worst CMP. PMI (or "second-worst" CMP. PMI) | Best CMP. PMI (or "second-best" CMP. PMI) |
| Example 8 | Best CMP. PMI | Best CMP. PMI (or "second-best" CMP. PMI) | Best CMP. PMI (or "third-best" CMP. PMI) | Best CMP. PMI (or "fourth-best" CMP. PMI) |
| Example 9 | Worst CMP. PMI | Worst CMP. PMI (or "second-worst" CMP. PMI) | Worst CMP. PMI (or "third-worst" CMP. PMI) | Worst CMP. PMI (or "fourth-worst" CMP. PMI) |

In the case of scheme 1-2, when a plurality of CMP. PMIs is simultaneously transmitted as illustrated in Table 4, the CMP. PMIs may be transmitted through plural subframes. In this case, $N_{CoMP}$ varies with the number of subframes through which plural CMP. PMIs are transmitted.

Scheme 1-3: Transmission of WB PMIs for Two or More c-eNBs (e.g. $N_{CoMP}=\lceil C/2 \rceil + \alpha$ when WB PMIs for Two c-eNBs are Transmitted)

Figure 20:
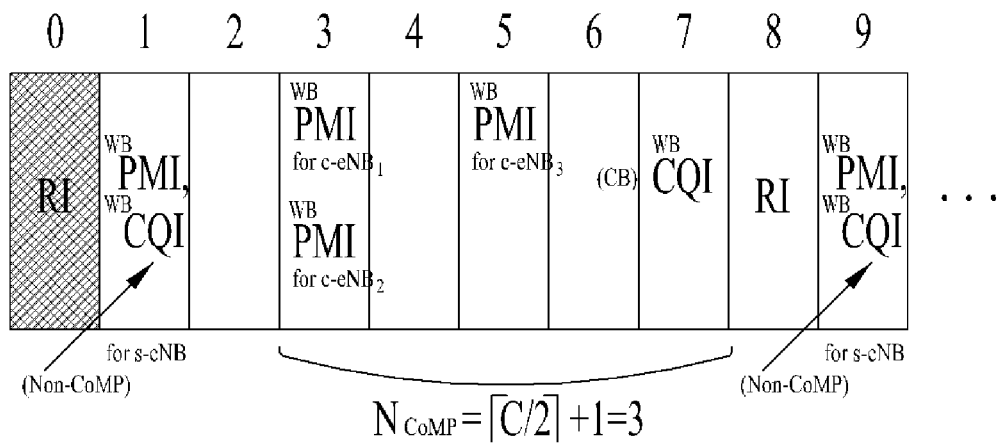
Figure 21:
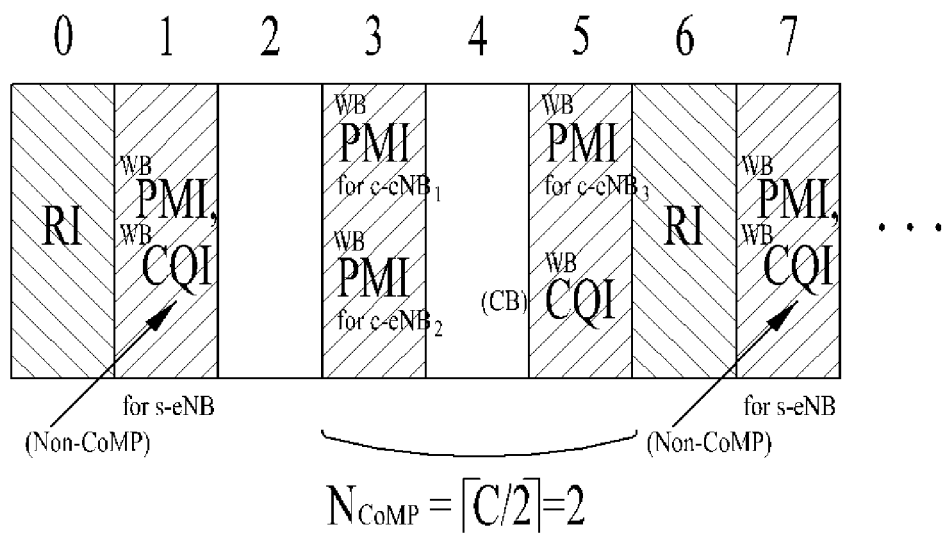
Figure 22:
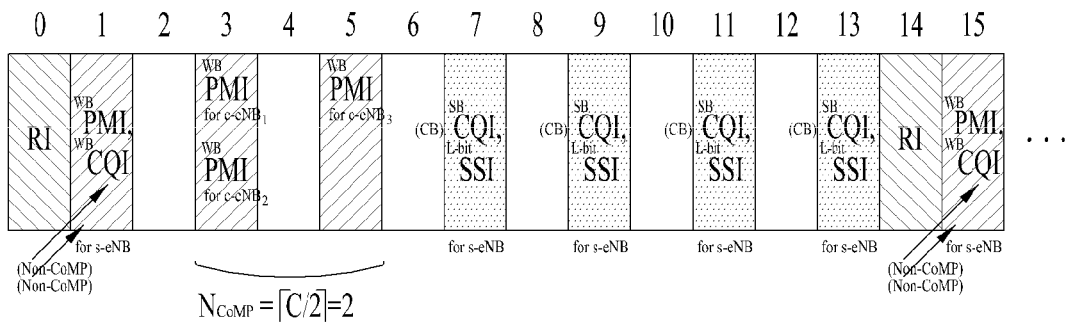

FIGS. 20, 21 and 22 illustrate CoMP CSI feedback according to scheme 1-3. FIGS. 20 and 21 illustrate modifications of mode 1-1 (WB CSI reporting) for CoMP feedback and FIG. 22 illustrates a modification of mode 2-1 (SB CSI reporting) for CoMP feedback.

FIG. 20 illustrates a case in which C=3, $\alpha=1$, $N_{pd}=2$ and $M_{RI}=1$ in mode 1-1 (WB CSI reporting). While scheme 1-3 includes scheme 1-1, the Report 1 feedback period at which an RI is transmitted is changed to $M_{RI} \cdot (1+N_{CoMP}) \cdot N_{pd}=8$ subframes in scheme 1-3 because $N_{CoMP}=3$, which is different from scheme 1-1.

Scheme 1-3 transmits different WB PMIs for c-eNBs in a reporting instance through subframes corresponding to SI=3 and SI=5, as illustrated in FIG. 20. That is, scheme 1-1 transmits only a WB PMI for each c-eNB in a reporting instance, whereas scheme 1-3 transmits two or more PMIs in a reporting instance when a remaining bit width in the reporting instance is sufficiently wide. Accordingly, scheme 1-3 can conserve feedback resources compared to scheme 1-1. When two PMIs are simultaneously transmitted as illustrated in FIG. 20, a PMI for c-eNB$_3$ may be transmitted alone in the subframe corresponding to SI=5 because C=3. When a PMI for a c-eNB is transmitted alone in this manner, the PMI may be moved to the subframe corresponding to SI=3 and thus three PMIs can be simultaneously transmitted in a reporting instance. While FIG. 20 illustrates stand-alone transmission of the PMI for c-eNB$_3$, a c-eNB index for stand-alone PMI transmission may be designated. For example, one of c-eNB$_1$, c-eNB$_2$ and c-eNB$_3$ can be designated and a PMI for the designated c-eNB can be transmitted alone. A c-eNB designated for stand-alone PMI transmission may be fixed or varied according to predetermined pattern/signaling. Furthermore, various modifications and extensions are possible in such a manner that other information is transmitted using a reporting instance in which a PMI for a c-eNB is transmitted alone or scheme 1-2 is applied to a PMI transmitted alone.

The present embodiment illustrates a case in which $\alpha=1$ for standalone transmission of a WB CB CQI (SI=7). When a PMI for a c-eNB (PMI for c-eNB$_3$, SI=5) is transmitted alone, as illustrated in FIG. 20, however, a scheme of simultaneously transmitting the PMI for c-eNB$_3$ and the WB CB CQI in a reporting instance can be considered. This scheme is illustrated in FIG. 21. Referring to FIG. 21, the WB CB CQI, which is transmitted alone in the subframe corresponding to S7 in FIG. 20, is transmitted along with the PMI for c-eNB$_3$ in the subframe corresponding to SI=5. To achieve this, $\alpha$ is set to 0 and the Report 1 feedback period at which an RI is transmitted is changed to $M_{RI} \cdot (1+N_{CoMP}) \cdot N_{pd}=6$ subframes in FIG. 21.

FIG. 22 illustrates a case in which C=3, $\alpha=0$, $N_{pd}=2$, J=4, K=1 and $M_{RI}=1$ in mode 2-1 (SB CSI reporting). The CSI feedback scheme illustrated in FIG. 22 includes scheme 1-1 and the Report 1 feedback period at which an RI is transmitted is changed to $M_{RI} \cdot (J \cdot K+1+N_{CoMP}) \cdot N_{pd}=14$ subframes because $N_{CoMP}=2$, which is different from scheme 1-1. Accordingly, SI=9, SI=11, SI=13 and SI=15 in Table 2 are replaced by SI=7, SI=9, SI=11 and SI=13 to represent report content of FIG. 22. That is, the report content of scheme 1-1 is applicable to scheme 1-3 although corresponding SIs in Table 2 are changed according to feedback period variation. When two PMIs are aggregated and simultaneously transmitted, as illustrated in FIG. 22, the PMI for c-eNB$_3$ may be transmitted alone in the subframe corresponding to SI=5 since C=3. When a PMI for a c-eNB is transmitted alone in this manner, the PMI may be moved to the subframe corresponding to SI=3 and thus three PMIs can be simultaneously transmitted in a reporting instance. A c-eNB index for stand-alone PMI transmission may be designated. For example, one of c-eNB$_1$, c-eNB$_2$ and c-eNB$_3$ can be designated and a PMI for the designated c-eNB can be transmitted alone. Furthermore, various modifications and extensions are possible in such a manner that other information is transmitted using a reporting instance in which a PMI for a c-eNB is transmitted alone and scheme 1-2 is applied to a PMI transmitted alone.

Particularly, scheme 1-2 and scheme 1-3 may be interchanged according to the number C of coordinating cells (or eNBs). For example, if two PMIs can be reported in one subframe, report content can be changed and transmitted according to the number of coordinating cells. In an implementation, CMP. PMIs (e.g. two best PMIs, two worst PMIs or a best PMI and a worst PMI in Table 3) for a single coordinating cell can be reported in the case of a single coordinating cell (C=1), whereas a CMP. PMI (e.g. a best PMI for each coordinating cell or a worst PMI for each coordinating cell) for each coordinating cell can be reported in the case of two coordinating cells (C=2). That is, the CSI feedback scheme can be switched such that scheme 1-2 is employed in the case of a single coordinating cell and scheme 1-3 is employed in the case of two coordinating cells. In this case, $N_{CoMP}=1+\alpha$ at all times irrespective of scheme 1-2 and scheme 1-3.

Scheme 1-4: Selective Transmission of Best WB PMI for c-eNB ($N_{CoMP}=1+\alpha$)

Figure 23:
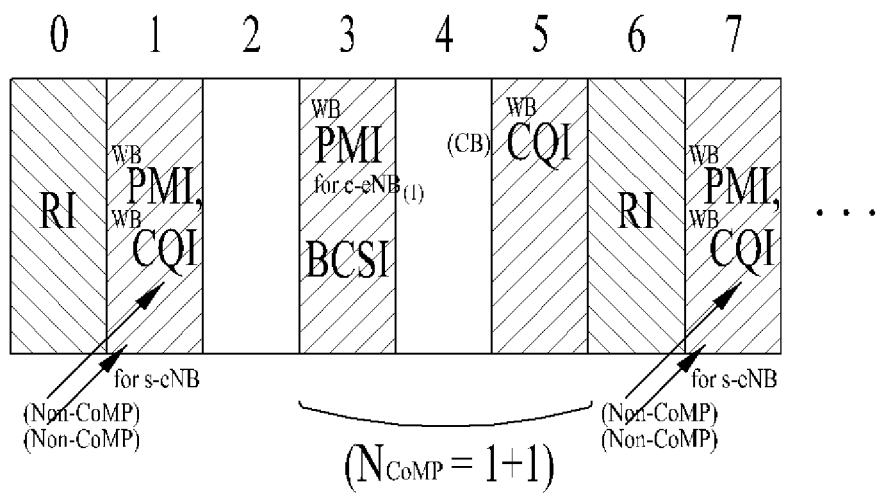
Figure 24:
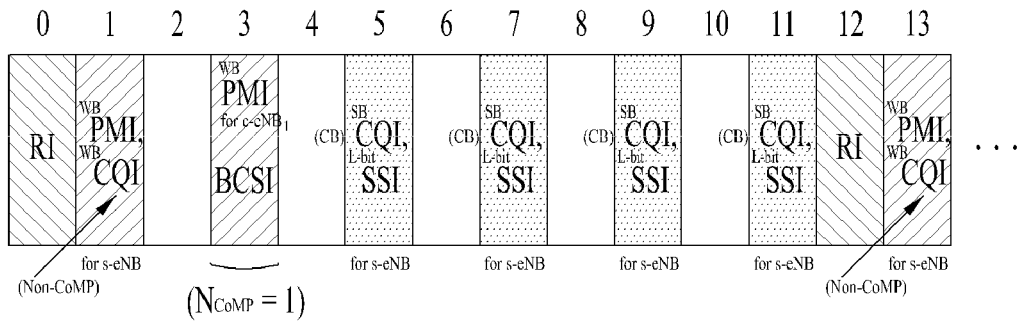

FIGS. 23 and 24 illustrate CoMP feedback according to scheme 1-4. FIG. 23 illustrates a modification of mode 1-1 (WB CSI reporting) for CoMP feedback and FIG. 24 illustrates a modification of mode 2-1 (SB CSI reporting) for CoMP feedback.

FIG. 23 illustrates a case in which C=3, $\alpha=1$, $N_{pd}=2$ and $M_{RI}=1$ in mode 1-1 (WB CSI reporting). While scheme 1-4 includes scheme 1-1, the Report 1 feedback period at which an RI is transmitted is changed to $M_{RI}\cdot(1+N_{CoMP})\cdot N_{pd}=6$ subframes in scheme 1-4 because $N_{CoMP}=2$ which is different from that of scheme 1-1.

Scheme 1-4 is a method for selecting a best c-eNB (referred to as c-eNB$_{(1)}$) that provides the best CB performance during WB CoMP CB operation with the s-eNB from among c-eNBs in a coordinating set and reporting a PMI for the best c-eNB and a best c-eNB selection indicator (BCSI), as illustrated in FIG. 23. That is, scheme 1-4 is a scheme by which a UE selects a best c-eNB and feeds back a PMI for the best c-eNB and may be set when participation of all c-eNBs in the coordinating set in CoMP CB is difficult. Operating modes of scheme 1-4 may be configured through higher layer (e.g. RRC) signaling or indicated through predetermined specific downlink signaling. While FIG. 23 illustrates transmission of the BCSI in the subframe corresponding to SI=3, this is exemplary and various modifications can be achieved in such a manner that a WB CB CQI and the BCSI are simultaneously transmitted in the subframe corresponding to SI=5.

Table 5 shows combinations of report content transmittable in the subframes corresponding to SI=3 and SI=5.

TABLE 5

| | SI = 3 | SI = 5 | Notes |
|---|---|---|---|
| Example 1 | WB PMI for c-eNB(1), BCSI | WB CB CQI | Identical to FIG. 23 |
| Example 2 | WB PMI for c-eNB(1) | WB CB CQI, BCSI | BCSI and WB CB CQI are simultaneously transmitted. |
| Example 3 | Two or more WB PMIs for c-eNB(1) are transmitted according to scheme 1-2. BCSI | WB CB CQI | Scheme 1-2 is applied to SI = 3. BCSI is also transmitted in the subframe corresponding to SI = 5. |
| Example 4 | Two or more WB PMIs for c-eNB(1) are transmitted according to scheme 1-2. | WB CB CQI, BCSI | Scheme 1-2 is applied to SI = 3. BCSI is also transmitted in the subframe corresponding to SI = 5. |

In the case of examples 3 and 4 of Table 5, various combinations of CMP PMIs illustrated in Table 4 are applicable as scheme 1-2 is applied to SI=3.

FIG. 24 illustrates a case in which C=3, $\alpha=0$, $N_{pd}=2$, J=4, K=1 and $M_{RI}=1$ in mode 2-1 (SB CSI reporting). While this scheme includes scheme 1-1, the Report 1 feedback period at which an RI is transmitted is changed to $M_{RI}\cdot(J\cdot K+1+N_{CoMP})\cdot N_{pd}=12$ subframes in this scheme because $N_{CoMP}=1$, which is different from scheme 1-1 of FIG. 17.

SI=9, SI=11, SI=13 and SI=15 in Table 2 may be replaced by SI=5, SI=7, SI=9 and SI=11 to represent report content of FIG. 24. That is, all the report content of scheme 1-1 is applicable to scheme 1-4 although the corresponding SIs in Table 2 are changed according to feedback period variation. Furthermore, two or more PMIs for c-eNB$_{(1)}$ may be simultaneously fed back and various CMP. PMI combinations illustrated in Table 4 are applicable by applying scheme 1-2 to SI=3.

Embodiment 2

Hierarchical PMI

The present embodiment extends single-cell based feedback to CoMP feedback for CB operation when a UE can dynamically select and report feedback content using the 1-bit PTI parameter as illustrated in FIG. 14. Specifically, the Report 2 transmission period (J·K+1)·$N_c$ in FIG. 14(b) may be modified as follows in the CoMP mode.

$$(J\cdot K+1+N_{CoMP})\cdot N_c \quad \text{[Equation 15]}$$

Here, J, K and $N_C$ are as defined above and $N_{CoMP}$ is an integer greater than 1.

According to Equation 15, a WB reporting period of 1+$N_{CoMP}$ corresponding to WB CSI for the s-eNB and c-eNB(s) can be secured in addition to an SB CSI reporting cycle for the s-eNB, which corresponds to J·K, by adding a WB CSI report transmission period for the c-eNB(s), which corresponds to $N_{CoMP}$ reporting instance(s) during SB CSI reporting. Accordingly, the s-eNB can perform wideband beam avoidance by recommending a PMI for CB to each c-eNB on the basis of WB CSI for each c-eNB, which is reported to the s-eNB. In addition, feedback information of the SB CSI reporting period can be selected such that CoMP CB performance is maximized based on reported WB CSI for the c-eNB(s).

The Report 1 transmission period $M_{RI}(J\cdot K+1)\cdot N_c$ in FIG. 14 may be modified as follows in the CoMP mode.

$$M_{RI}\cdot(J\cdot K+1+N_{CoMP})\cdot N_c \quad \text{[Equation 16]}$$

Here, J, K, $N_c$ and $N_{CoMP}$ are as defined above.

It is desirable to maintain the Report 1 transmission period irrespective of PTI=0 or PTI=1 by setting the Report 1 transmission period equal to that when PTI=0. This is because it is difficult to estimate error propagation accumulated after generation of errors in transmission of Report 1 if Report 1 transmission timing varies with PTI. Referring to Equation 16, the Report 1 transmission period is determined as $M_{RI}$ times the Report 2 transmission period and $M_{RI}$ is set by higher layer signaling. In the case of PTI=0, an interval between the Report 1 transmission periods may be occupied with appropriate WB CoMP CSI for the s-eNB and c-eNB(s) and repeated in available reporting instance(s) until the next Report 1. That is, it is possible to configure report content such that effective WB CSI reporting can be performed when PTI=0 within the period represented by Equation 16 by arranging report content such that CSI that has high importance and requires fast reporting is transmitted first.

Embodiment 2 will now be described in more detail with reference to the attached drawings. In the following description, the number of c-eNBs in a coordinating set is defined as C. Specifically, available feedback patterns and methods therefor according to schemes of defining $N_{CoMP}$ will now be described.

Scheme 2-1: Stand-Alone Transmission of WB PMI for Each c-eNB ($N_{CoMP}$=C)

Figure 25:
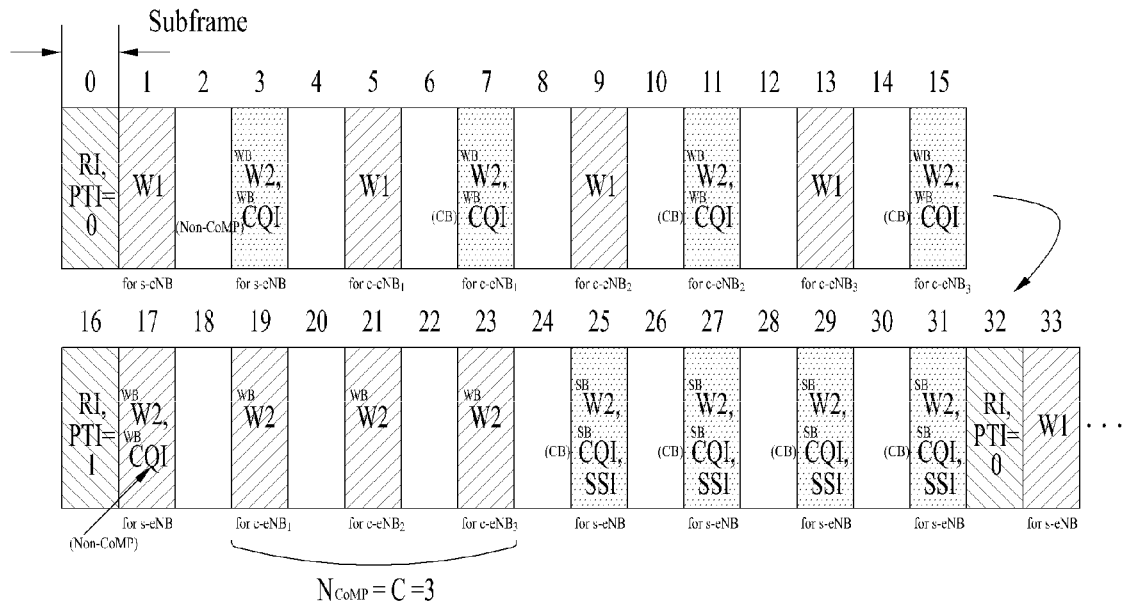
FIGS. 25 to 28 illustrate processes of periodically reporting channel state information when a hierarchical codebook is used according to an embodiment of the present invention.

FIG. 25 illustrates CoMP CSI feedback according to scheme 2-1. FIG. 25 illustrates a case in which a hierarchical codebook is used, C=3, J=4, K=1, $N_c$=2 and $M_{RI}$=1.

Referring to FIG. 25, WB W2s for c-eNBs are independently transmitted in subframes corresponding to SI=19, SI=21 and SI=23 and $N_{CoMP}$=C=3 is applied to Equations 15 and 16 to determine a transmission period. When WB W2s for c-eNBs are respectively transmitted in the subframes corresponding to SI=19, SI=21 and SI=23 as illustrated in FIG. 25, highly secure coding is possible compared to transmission of PMI+CQI. Specifically, since a maximum payload allocated to a reporting instance of PUCCH-based periodic CSI feedback, which is being discussed in LTE-A, is 11 bits and the maximum number of bits is 4 according to a rank during stand-alone transmission of a WB PMI, highly secure coding can be achieved due to low payload size in the case of stand-alone transmission of a WB PMI for each c-eNB. That is, beam avoidance can be maximized by feeding back WB W2 for a c-eNB with high reliability for CoMP CB. In the present embodiment, the UE can select SB CSI (e.g. SB W2, SB CQI and SSI) for the s-eNB in subframes corresponding to SI=25, SI=27, SI=29 and SI=31 on the basis of reported WB CSI of c-eNBs such that CoMP CB performance is maximized. The SB CQI may be a CB SB CQI value in which a gain when all c-eNB$_1$, c-eNB$_2$ and c-eNB$_3$ perform CB is reflected. The SSI is a parameter indicating a subband selected from subbands in a BP. If a subband is selected according to a predetermined/signaled pattern (or cycling), transmission of the SSI may be omitted.

WB W2 and WB a non-CoMP CQI for the s-eNB are transmitted in the subframe corresponding to SI=17 because the WB non-CoMP CQI is necessary to determine an aggregation level and a power level in a PDCCH which is a downlink control channel and WB W2 can be used for fall-back into a non-CoMP mode as necessary. For the same purpose, a WB non-CoMP CQI and WB W2 are transmitted in the subframe corresponding to SI=3 when PTI=0. When PTI=0 for transmission of WB CSI, W1 and W2 are separately transmitted. That is, through two reporting instances, W1 is transmitted alone for the purpose of highly secure coding first and then WB W2 and WB CQI are transmitted for each eNB in the coordinating set. A WB CQI for each c-eNB may be defined in various manners. For example, a CQI corresponding to SI=7 can be defined as a CQI when the s-eNB and c-eNB$_1$ participate in CB, a CQI corresponding to SI=11 can be defined as a CQI when the s-eNB and c-eNB$_2$ participate in CB, and a CQI corresponding to SI=15 can be defined as a CQI when the s-eNB and c-eNB$_3$ participate in CB. Alternatively, a CQI may be defined in such a manner that the number of c-eNBs participating in CB increases as SI increases. Specifically, the CQI corresponding to SI=7 can be defined as a CQI when the s-eNB and c-eNB$_i$ participate in CB, the CQI corresponding to SI=11 can be defined as a CQI when the s-eNB, c-eNB$_1$ and c-eNB$_2$ participate in CB, and the CQI corresponding to SI=15 can be defined as a CQI when the s-eNB, c-eNB$_1$, c-eNB$_2$ and c-eNB$_3$ participate in CB.

FIG. 25 illustrate an example for aiding in description of scheme 2-1 and report content in FIG. 25 may be modified into the following various combinations. That is, various types of report content shown in Tables 6, 7 and 8 in addition to the above-described report content can be transmitted in corresponding subframes. Table 6 illustrates SB report content for the s-eNB, which can be transmitted when PTI=1. Table 7 illustrates WB report content for the s-eNB, which can be transmitted when PTI=0 and Table 8 illustrates WB report content for c-eNBs, which can be transmitted when PTI=0.

TABLE 6

| | Report content to be transmitted in subframes corresponding to SI = 25, 27, 29 and 31 | Notes |
|---|---|---|
| Example 1 | SB W2, SB CB CQI, SSI | Identical to FIG. 25 |
| Example 2 | SB W2, SB CB CQI | SB is selected according to predetermined/signaled pattern (or cycling) and SSI is omitted. |
| Example 3 | SB CB CQI, SSI | Transmission of SB W2 is omitted. That is, PMI uses WB corresponding SI = 17 and only CQI is fed back based on SB. |
| Example 4 | SB CB CQI | SB is selected according to predetermined/signaled pattern (or cycling) and SSI is omitted. |

TABLE 7

| | SI = 1 | SI = 3 | Notes |
|---|---|---|---|
| Example 1 | W1 | WB W2, WB non-CoMP CQI | Identical to FIG. 25 |
| Example 2 | W1, WB W2 | WB non-CoMP CQI | W1 and W2 are simultaneously transmitted in subframe corresponding to SI = 1. |
| Example 3 | W1, WB non-CoMP CQI | WB W2, WB CB CQI | CB CQI is also transmitted. |

TABLE 8

| | SI = 5 | SI = 7 | SI = 9 | SI = 11 | SI = 13 | SI = 15 |
|---|---|---|---|---|---|---|
| Example 1 | W1 | WB W2, WB CB CQI (s-eNB, c-eNB1) | W1 | WB W2, WB CB CQI (s-eNB, c-eNB1, c-eNB2) | W1 | WB W2, WB CB CQI (s-eNB, c-eNB1, c-eNB2, c-eNB3) |
| | | For c-eNB1 | | For c-eNB2 | | For c-eNB3 |
| Example 2 | W1 | WB W2, WB CB CQI (s-eNB, c-eNB1) | W1 | WB W2, WB CB CQI (s-eNB, c-eNB2) | W1 | WB W2, WB CB CQI (s-eNB, c-eNB3) |
| | | For c-eNB1 | | For c-eNB2 | | For c-eNB3 |

TABLE 8-continued

|  | SI = 5 | SI = 7 | SI = 9 | SI = 11 | SI = 13 | SI = 15 |
|---|---|---|---|---|---|---|
| Example 3 (example 3 of Table 7) | W1 | WB W2 For c-eNB1 | W1 | WB W2 For c-eNB2 | W1 | WB W2 For c-eNB3 |
| Example 4 | W1, WB W2 | WB CB CQI (s-eNB, c-eNB1) For c-eNB1 | W1, WB W2 | WB CB CQI (s-eNB, c-eNB1, c-eNB2) For c-eNB2 | W1, WB W2 | WB CB CQI (s-eNB, c-eNB1, c-eNB2, c-eNB3) For c-eNB3 |
| Example 5 | W1, WB W2 | WB CB CQI (s-eNB, c-eNB1) For c-eNB1 | W1, WB W2 | WB CB CQI (s-eNB, c-eNB2) For c-eNB2 | W1, WB W2 | WB CB CQI (s-eNB, c-eNB3) For c-eNB3 |
| Example 6 | W1, WB W2 for c-eNB1 | W1, WB W2 for c-eNB2 | W1, WB W2 for c-eNB3 | WB CB CQI (s-eNB, c-eNB1, c-eNB2, c-eNB3) | (SI = 1 repeated) | (SI = 3 repeated) |
| Example 7 | W1, WB W2 for c-eNB1 | W1, WB W2 for c-eNB2 | W1, WB W2 for eNB3 | (SI = 1 repeated) | (SI = 3 repeated) | (SI = 5 repeated) |

In Table 8, s-eNB and c-eNB(s) described in parentheses for each WB CB CQI for each c-eNB denote an s-eNB and c-eNB(s) that participate in CB during CB CQI calculation. For example, in example 1 of Table 8, WB CB CQI (s-eNB, c-eNB1) corresponding to SI=7 represents a CQI when the s-eNB and c-eNB1 participate in CB, WB CB CQI (s-eNB, c-eNB1, c-eNB2) corresponding to SI=11 represents a CQI when the s-eNB, c-eNB1 and c-eNB2 participate in CB, and WB CB CQI (s-eNB, c-eNB1, c-eNB2, c-eNB3) corresponding to SI=15 represents a CQI when the s-eNB, c-eNB1, c-eNB2 and c-eNB3 participate in CB.

Scheme 2-2: Transmission of Plural WB PMIs for Each c-eNB ($N_{CoMP}=C$)

Figure 26:
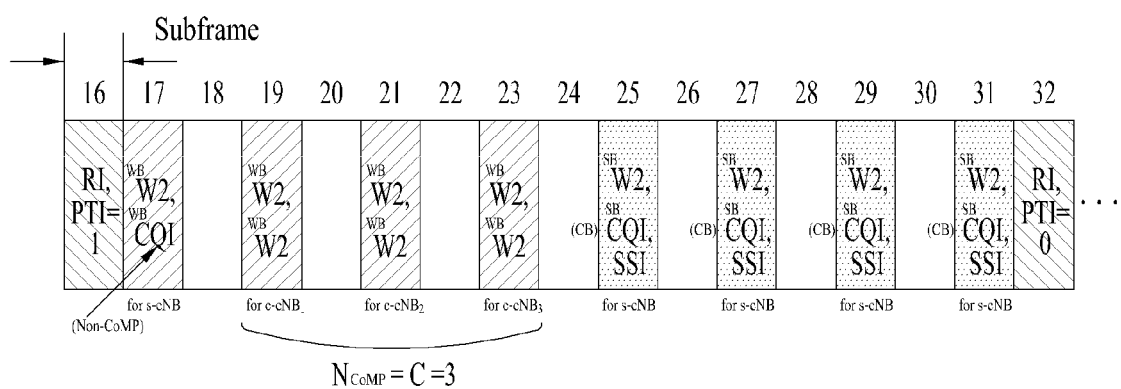

FIG. 26 illustrates CoMP CSI feedback according to scheme 2-2.

Scheme 2-2 includes scheme 2-1 and simultaneously transmits a plurality of PMIs per c-eNB in subframes corresponding to SI=19, SI=21 and SI=23 as content of the WB CSI transmission period for each c-eNB, as illustrated in FIG. 26. When a hierarchical codebook is used as illustrated in FIG. 26, W1s for c-eNBs, reported when PTI=0, and WB W2s for the c-eNBs, reported in the subframes corresponding to SI=19, SI=21 and SI=23, are combined to configure final PMIs. Here, it is possible to additionally improve beam granularity by simultaneously feeding back a plurality of WB W2s in the subframes corresponding to SI=19, SI=21 and SI=23. For example, if a codebook size for W2 is 4 bits, a total of 16 codebook indices (CIs), CI=0, CI=1, ..., CI=15, are present. Only the case of c-eNB$_1$ corresponding to SI=19 is discussed (the same discussion is applied to c-eNB$_2$ and c-eNB$_3$ respectively corresponding to SI=21 and SI=23). WB W2 is transmitted alone in the subframe corresponding to SI=19 through scheme 1-2. Here, it is assumed that the selected W2 corresponds to CI=3. Since a codebook is obtained by quantizing a continuous beam at an appropriate interval, the selected codebook corresponding to CI=3 may be closest to the actual beam. For example, the actual beam may be present between CI=3 and CI=4. In this case, if two W2s can be simultaneously transmitted according to scheme 2-2, a UE can simultaneously feed back codebooks corresponding to CI=3 and CI=4 and an eNB can average the codebooks corresponding to CI=3 and CI=4 according to a predetermined average rule, thereby additionally improving beam granularity. If the actual beam is in close proximity to the codebook of CI=3, two codebooks corresponding to CI=3 can be simultaneously fed back. The predetermined average rule may include averaging beam vectors, averaging only phases of two beams, etc. When two W2s are referred to as W2-A and W2-B, W2-A and W2-B can be combined in various manners, as shown in Table 9, and transmitted.

Table 9 illustrates WB report content for c-eNBs, which can be transmitted when PTI=1.

TABLE 9

| | Report content to be transmitted in subframes corresponding to SI = 19, 21 and 23 | |
|---|---|---|
| | W2-A | W2-B |
| Example 1 | Best CMP. W2 | Worst CMP. W2 |
| Example 2 | Best CMP. W2 | Best CMP. W2 (or "second-best CMP. W2) |
| Example 3 | Worst CMP. W2 | Worst CMP. W2 (or "second-worst CMP. W2) |

Example 1 of Table 9 shows a case in which a best CMP. W2 and a worst CMP. W2 are simultaneously fed back (e.g. in the same subframe). Here, the best CMP. W2 refers to W2 for a c-eNB, which provides best CB performance during CB which is performed by a PMI configured by combining W2 and corresponding W1 and a PMI for the s-eNB, whereas the worst CMP. W2 refers to W2 for a c-eNB, which provides worst CB performance during CB which is performed by the PMI configured by combining W2 and corresponding W1 and the PMI for the s-eNB. The corresponding c-eNB can use the information such that reported worst CMP. W2 is selected as infrequently as possible. Example 2 shows a case in which two best CMP. W2s are simultaneously fed back. In this case, a best CMP. W2 may be fed back twice in a reporting instance or a best CMP. W2 and a second-best CMP. W2 may be simultaneously fed back in a reporting instance (e.g. a subframe) such that a PMI selected by a c-eNB is not fixed to a specific one. Here, a best CMP. W2 can be fed back twice when the second-best CMP. W2 is not satisfactory. Example 3 shows a case in which a worst CMP. W2 is fed back twice or a worst CMP. W2 and a second-worst CMP. W2 are simultaneously fed back.

In Table 9, W2-A and W2-B are content simultaneously transmitted in a reporting instance without priority and thus descriptions of W2-A and W2-B in Table 9 are interchangeable. When three or more CMP W2s are fed back in a reporting instance, W2-C, W2-D, . . . may be added to Table 9, as is shown in Table 10. Examples 1, 2 and 3 in Table 10 are identical to those of Table 9. As shown in Table 10, when W2-C is added, corresponding W2s illustrated in Table 10 are applicable. When W2-D is added, corresponding W2s illustrated in Table 10 are applicable. In this manner, the scheme of transmitting CMP. W2 can be normalized and extended when the number of CMP. W2s is increased.

TABLE 10

Report content to be transmitted in subframes corresponding to SI = 19, 21 and 23

| | W2-A | W2-B | W2-C | W2-D |
|---|---|---|---|---|
| Example 1 | Best CMP. W2 | Worst CMP. W2 | | |
| Example 2 | Best CMP. W2 | Best CMP. W2 (or "second-best" CMP. W2) | | |
| Example 3 | Worst CMP. W2 | Worst CMP. W2 (or "second-worst" CMP. W2) | | |
| Example 4 | Best CMP. W2 | Worst CMP. W2 | Best CMP. W2 (or "second-best" CMP. W2) | Best CMP. W2 (or "third-best" CMP. W2) |
| Example 5 | Best CMP. W2 | Worst CMP. W2 | Worst CMP. W2 (or "second-worst" CMP. W2) | Worst CMP. W2 (or "third-worst" CMP. W2) |
| Example 6 | Best CMP. W2 | Worst CMP. W2 | Best CMP. W2 (or "second-best" CMP. W2) | Worst CMP. W2 (or "second-worst" CMP. W2) |
| Example 7 | Best CMP. W2 | Worst CMP. W2 | Worst CMP. W2 (or "second-worst" CMP. W2) | Best CMP. W2 (or "second-best" CMP. W2) |
| Example 8 | Best CMP. W2 | Best CMP. W2 (or "second-best" CMP. W2) | Best CMP. W2 (or "third-best" CMP. W2) | Best CMP. W2 (or "fourth-best" CMP. W2) |
| Example 9 | Worst CMP. W2 | Worst CMP. W2 (or "second-worst" CMP. W2) | Worst CMP. W2 (or "third-worst" CMP. W2) | Worst CMP. W2 (or "fourth-worst" CMP. W2) |

In the case of scheme 2-2, when plural CMP. W2s are simultaneously transmitted as illustrated in Table 9, the CMP W2s may be transmitted through plural subframes. In this case, $N_{CoMP}$ varies with the number of subframes through which plural CMP. W2s are transmitted.

In the case of PUCCH-based CSI feedback, which is being discussed in LTE-A, since a maximum payload size allocated to one reporting instance is 11 bits and the maximum number of bits of W2 is 4, two W2s can be transmitted on a PUCCH according to scheme 2-2, as illustrated in Table 9 (4 bits+4 bits). Although scheme 2-2 has a CSI payload size larger than scheme 2-1, scheme 2-2 can achieve highly secure coding due to 8-bit payload size, which is smaller than the maximum payload size of 11 bits. That is, scheme 2-1 can achieve very high W2 protection, whereas scheme 2-2 can simultaneously transmit plural CMP. W2s while achieving appropriate W2 protection.

Furthermore, scheme 2-2 may also be applied to a case in which W1 and WB W2 are simultaneously transmitted in one subframe, as illustrated in examples 4, 5, 6 and 7 of Table 8. When W1 and W2 have payload sizes smaller than the maximum payload size due to subsampling of W1/W2 even if W1 and W2 are simultaneously transmitted in one reporting instance, plural pairs of W1 and W2 can be simultaneously transmitted. In this case, various content combinations obtained when "W2" is regarded as subsampled "W1+W2" in Tables 9 and 10, that is, various feedback content combinations including a best CMP. W1+W2 pair or a worst CMP. W1 and W2 can be transmitted. Since a payload size of joint encoding of W1+W2 is limited to 4 bits through subsampling in the LTE-A PUCCH-based CSI feedback mode, a plurality of W1+W2 pairs can be simultaneously transmitted. For transmission of plural of W1+W2 pairs, one common W1 can be selected and plural CMP. W2s can be combined with the common W1 and transmitted. This scheme is not limited to a specific feedback mode and can be applied to any case in which W1 and W2 are jointly encoded and transmitted together in one subframe.

Scheme 2-3: Transmission of WB PMIs for Two or More c-eNBs (e.g. $N_{CoMP}=\lceil C/2 \rceil$ when WB PMIs for Two c-eNBs are Transmitted)

Figure 27:
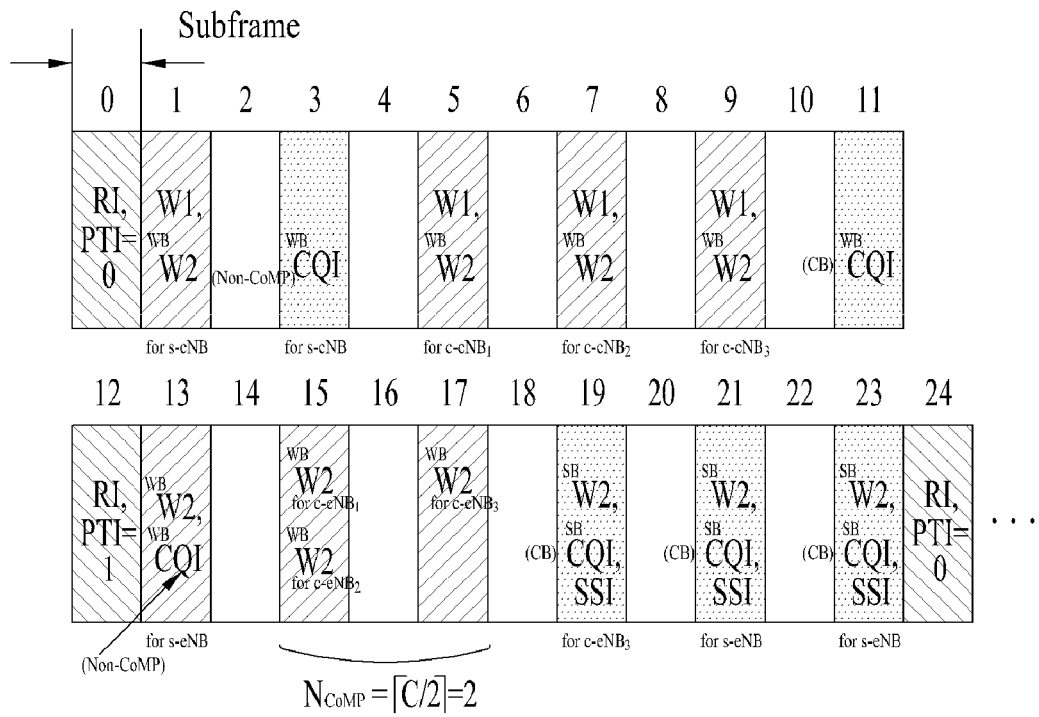

FIG. 27 illustrates CoMP CSI feedback according to scheme 2-3.

FIG. 27 illustrates a case in which a hierarchical codebook is used, C=3, J=3, K=1, $N_c$=2 and $M_{RI}$=1. While scheme 2-3 includes scheme 2-1, the Report 1 feedback period at which an RI and PTI are transmitted is changed to $M_{RI'}(J \cdot K+1+N_{CoMP}) \cdot N_c$=12 subframes in scheme 2-3 because $N_{CoMP}$=2 and J=3, which are different from those of scheme 2-1. Accordingly, report content corresponding to SI=25, SI=27, SI=29 and SI=31 in Table 6 needs to be changed to content corresponding to SI=19, SI=21 and SI=23 in FIG. 27, Table 7 is applicable without change, and report content corresponding to SI=5, SI=7, SI=9, SI=11, SI=13 and SI=15 in Table 8 needs to be changed to content corresponding to SI=5, SI=7, SI=9 and SI=11 in FIG. 27. That is, while corresponding SIs in tables 6, 7 and 8 are changed according to feedback period variation, report content is all applicable. Specifically, FIG. 27 illustrates a case in which example 2 of Table 7 and example 6 of Table 8 are used when PTI=0. All report content illustrated in Tables 6, 7 and 8 may not be transmitted depending on feedback period and, when there are reporting instances left after transmission of all the report content, content corresponding to SI=1 may be repeatedly transmitted. However, this problem can be solved by appropriately adjusting K, Nc, $M_{RI}$, etc.

Scheme 2-3 transmits different WB W2s for c-eNBs in a reporting instance through subframes corresponding to SI=15 and SI=17, as illustrated in FIG. 27. That is, scheme 2-1 transmits a WB PMI for each c-eNB alone in a reporting instance, whereas scheme 2-3 transmits two or more PMIs in a reporting instance when a remaining bit width in the reporting instance is sufficiently wide, saving feedback resource. When two PMIs are simultaneously transmitted as illustrated in FIG. 27, a PMI for c-eNB$_3$ may be transmitted alone in the subframe corresponding to SI=17 because C=3.

When a PMI for a c-eNB is transmitted alone in this manner, the PMI may be moved to the subframe corresponding to SI=15 and thus three PMIs can be simultaneously transmitted in a reporting instance. A c-eNB index for stand-alone transmission of a PMI may be designated. For example, one of c-eNB$_1$, c-eNB$_2$ and c-eNB$_3$ can be designated and a PMI for the designated c-eNB can be transmitted alone. Furthermore, various modifications and extensions are possible in such a manner that other information is transmitted using a reporting instance in which a PMI for a c-eNB is transmitted alone and scheme 2-2 is applied to a PMI transmitted alone. In addition, W1 and W2 may be subsampled, joint-encoded and transmitted in a subframe corresponding to the W2.

Scheme 2-4: Selective Transmission of Best WB PMI for c-eNB in a Coordinating Set ($N_{CoMP}$=1)

Figure 28:
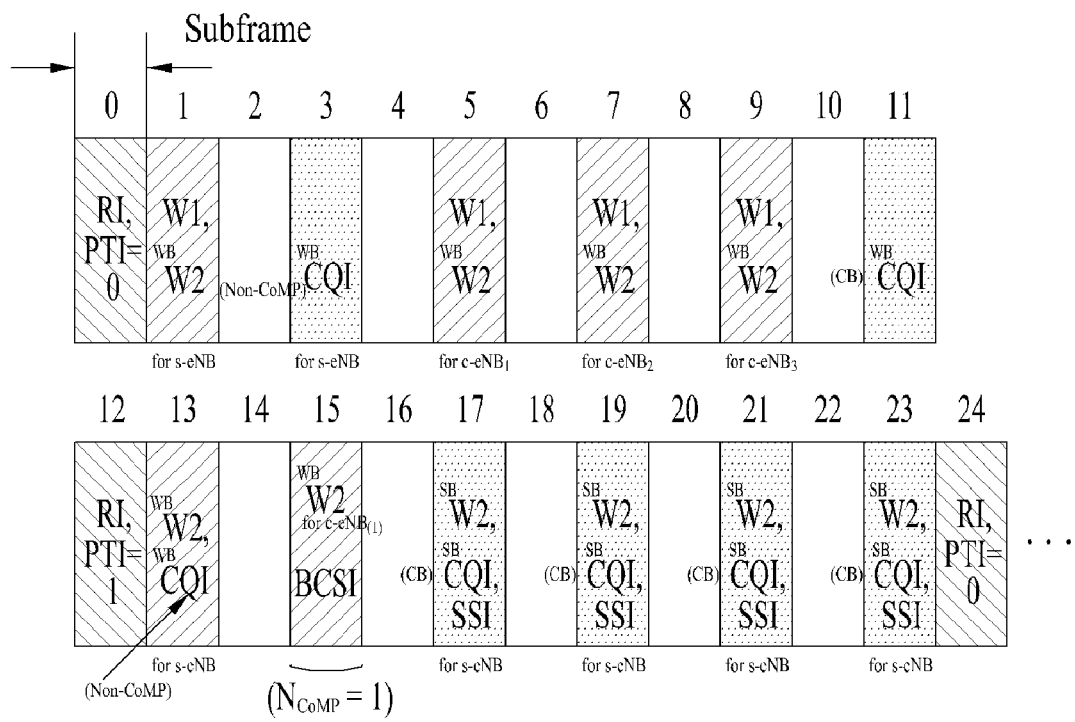

FIG. 28 illustrates CoMP feedback according to scheme 2-4.

FIG. 28 illustrates a case in which a hierarchical codebook is used, C=3, J=4, K=1, $N_c$=2 and $M_{RI}$=1. While scheme 2-4 includes scheme 2-1, the Report 1 feedback period at which an RI and PTI are transmitted is set to $M_{RI}$·(J·K+1+$N_{CoMP}$)·$N_c$=12 subframes corresponding to the Report 1 feedback period of scheme 2-3 shown in FIG. 27 in scheme 2-4 because $N_{CoMP}$=1 and J=4, which are different from scheme 2-1. Accordingly, report content corresponding to SI=25, SI=27, SI=29 and SI=31 in Table 6 needs to be changed to content corresponding to SI=19, SI=21 and SI=23 in FIG. 27, Table 7 is applicable without change, and report content corresponding to SI=5, SI=7, SI=9, SI=11, SI=13 and SI=15 in Table 8 needs to be changed to content corresponding to SI=5, SI=7, SI=9 and SI=11 in FIG. 27. That is, while corresponding SIs in tables 6, 7 and 8 are changed according to feedback period variation, report content is all applicable. All the report content illustrated in Tables 6, 7 and 8 may not be transmitted depending on feedback period and, when there are reporting instances left after transmission of all the report content, content corresponding to SI=1 may be repeatedly transmitted.

Scheme 2-4 is a method for selecting a best c-eNB (referred to as c-eNB$_{(1)}$) that provides the best CB performance during WB CoMP CB operation with the s-eNB from among c-eNBs in a coordinating set and reporting a PMI for the best c-eNB and a best c-eNB selection indicator (BCSI) in the subframe corresponding to SI=15, as illustrated in FIG. 28.

That is, scheme 2-4 is a scheme by which a UE selects a best c-eNB and feeds back a PMI for the best c-eNB and may be set when participation of all c-eNBs in the coordinating set in CoMP CB is difficult. Operating modes of scheme 2-4 may be configured through higher layer (e.g. RRC) signaling or indicated through predetermined specific downlink signaling. While FIG. 28 illustrates transmission of the BCSI in the subframe corresponding to SI=15, this is exemplary and various modifications can be achieved in such a manner that the BCSI is transmitted in a separate subframe or transmitted along with other feedback information.

While embodiments 1 and 2 and the schemes thereof have been separately described, they may be combined. For example, the schemes of embodiments 1 and 2 can be switched according to higher layer signaling, a predetermined event and a predetermined communication environment.

Figure 29:
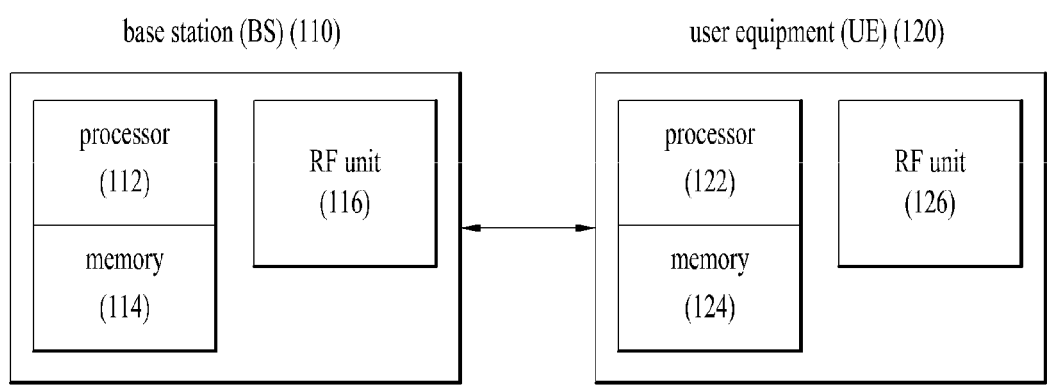
FIG. 29 illustrates a base station and a UE applicable to the present invention.

FIG. 29 illustrates a BS and a UE applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 29, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While application of the method and device for reporting channel state information in a 3GPP LTE wireless communication system has been described, the method and device for reporting channel state information in a wireless communication system can be applied to various wireless communication systems other than 3GPP LTE.

The invention claimed is:

1. A method for reporting channel state information at a UE in a wireless communication system, the method comprising:
   receiving configuration information for periodically reporting channel state information; and
   periodically reporting first channel state information related to a coordinated multi-point at a first period and second channel state information related to a serving-point at a second period based on the configuration information,
   wherein the second period is longer than the first period,
   wherein the second period is set to a first value in a single point transmission mode,
   wherein the second period is set to a sum of the first value and a second value in a coordinated multi-point transmission mode, and
   wherein the second value is proportional to the number of coordinating transmission points involved in the coordinated multi-point transmission.

2. The method according to claim 1, wherein the first period of the first channel state information corresponds to the second value in the second period.

3. The method according to claim 2, wherein the first channel state information includes channel state information about coordinated transmission points.

4. The method according to claim 3, wherein the first channel state information includes only a wideband PMI for a coordinated transmission point.

5. The method according to claim 3, wherein the first channel state information includes a CQI calculated on the assumption of a CoMP-CB (coordinated multi-point coordinated beamforming) operation.

6. The method according to claim 1, wherein the coordinated multi-point transmission includes a CoMP (coordinated multi point) operation.

7. The method according to claim 1, wherein the first and the second channel state information is transmitted through a physical uplink control channel (PUCCH).

8. A UE configured to transmit channel state information in a wireless communication system, comprising:
   a radio frequency (RF) module; and
   a processor configured to control the RF module,
   wherein the processor is further configured to:
   control the RF module to receive configuration information for periodically reporting channel state information, and
   control the RF module to periodically report first channel state information at a first period and second channel state information related to a serving-point at a second period based on the configuration information,
   wherein the second period is longer than the first period,
   wherein the second period is set to a first value in a single point transmission mode,
   wherein the second period is set to a sum of the first value and a second value in a coordinated multi-point transmission mode, and
   wherein the second value is proportional to the number of coordinating transmission points involved in the coordinated multi-point transmission.

9. The UE according to claim 8, wherein the first period of the first channel state information corresponds to the second value in the second period.

10. The UE according to claim 9, wherein the first channel state information includes channel state information about coordinated transmission points.

11. The UE according to claim 10, wherein the first channel state information includes only a wideband PMI for a coordinated transmission point.

12. The UE according to claim 10, wherein the first channel state information includes a CQI calculated on the assumption of a CoMP-CB (coordinated multi-point coordinated beamforming) operation.

13. The UE according to claim 8, wherein the coordinated multi-point transmission includes a CoMP (coordinated multi point) operation.

14. The UE according to claim 8, wherein the first and the second channel state information is transmitted through a physical uplink control channel (PUCCH).

* * * * *